(12) United States Patent
Couzin

(10) Patent No.: US 7,334,904 B2
(45) Date of Patent: *Feb. 26, 2008

(54) TRI-LEVEL CUBE CORNER RULING

(75) Inventor: Dennis I. Couzin, Evanston, IL (US)

(73) Assignee: Avery Dennison Corporation, Pasadena, CA (US)

(*) Notice: Subject to any disclaimer, the term of this patent is extended or adjusted under 35 U.S.C. 154(b) by 153 days.

This patent is subject to a terminal disclaimer.

(21) Appl. No.: 10/935,276

(22) Filed: Sep. 8, 2004

(65) Prior Publication Data

US 2005/0030624 A1  Feb. 10, 2005

Related U.S. Application Data

(62) Division of application No. 10/320,738, filed on Dec. 17, 2002, now Pat. No. 6,902,280.

(51) Int. Cl.
*G02B 5/124* (2006.01)
*A01J 21/00* (2006.01)

(52) U.S. Cl. ............................ 359/530; 425/470

(58) Field of Classification Search ........... 359/529, 359/530, 834–836; 425/470, 383, 195; 264/1.6, 264/1.9; 428/156, 163, 167
See application file for complete search history.

(56) References Cited

U.S. PATENT DOCUMENTS

| | | | |
|---|---|---|---|
| 3,541,606 A | 11/1970 | Heenan et al. | |
| 4,460,449 A | 7/1984 | Montalbano | |
| 4,478,769 A | 10/1984 | Pricone et al. | |
| 4,486,363 A | 12/1984 | Pricone et al. | |
| 4,588,258 A | 5/1986 | Hoopman | |
| 4,775,219 A | 10/1988 | Appeldorn et al. | |
| 5,557,836 A * | 9/1996 | Smith et al. ............... | 29/527.4 |
| 5,822,121 A | 10/1998 | Smith et al. | |
| 5,926,314 A | 7/1999 | Smith et al. | |
| 6,015,214 A | 1/2000 | Heenan et al. | |
| 6,083,607 A | 7/2000 | Mimura et al. | |
| 6,318,866 B1 | 11/2001 | Mimura et al. | |
| 6,390,629 B1 | 5/2002 | Mimura et al. | |
| 6,540,367 B1 * | 4/2003 | Benson et al. ............ | 359/530 |
| 6,685,323 B1 | 2/2004 | Mimura et al. | |
| 6,902,280 B2 * | 6/2005 | Couzin .................... | 359/530 |

OTHER PUBLICATIONS

K. N. Chandler, "The Theory of Corner-Cube Reflectors", Department of Scientific and Industrial Research, Road Research Laboratory, Oct. 1954.
Edson R. Peck, "Polarization Properties of Corner Reflectors and Cavities", Journal of the Optical Society of America, vol. 52, No. 3, Mar. 1962, pp. 253-257.
International Search Report dated May 4, 2004.

* cited by examiner

*Primary Examiner*—James Phan
(74) *Attorney, Agent, or Firm*—Roberts, Mlotkowski & Hobbes; Thomas W. Cole

(57) ABSTRACT

A rulable array of cube corners defined by three sets of parallel, equidistant, symmetrical vee-grooves is provided. The directions of the three vee-groove sets make three angles, no two of which are equal. When the array in viewed in plan, lines along the roots of the grooves determine a pattern of triangles in which the apices of the cube corners lie at distances from their respective triangle's centroid that are substantially less than the distance between the triangle's orthocenter and its centroid. In an unmetallized prismatic retroreflective sheeting, the array of quasi-triangular cube corners has the entrance angularity advantages of compound cant with nearly the efficiency of uncanted triangular cube corners at small entrance angles.

4 Claims, 32 Drawing Sheets

0° cant, n=1.586

0°cant, n=1.49

10° fmp cant, n=1.49

10° emp cant, n=1.49

50°-60°-70°, n=1.49

54°-54°-72° triangle
126°-126°-108° around apex

52°-56.05°-71.95° triangle
128°-123.95°-108.05° around apex

50°-58.24°-71.76° triangle
130°-121.76°-108.24° around apex

48°-60.61°-71.39° triangle
132°-119.39°-108.61° around apex

46°-63.34°-70.66° triangle
134°-116.66°-109.34° around apex 44.16°-67.92°-67.92° triangle
135.84°-112.08°-112.08° around apex 0° cant
66.7% effective aperture at β = 0°

9.74° cant -- face-more-parallel
50% effective aperture at β = 0°

9.74° cant -- 50°-60°-70° triangle
51.1% effective aperture at β = 0°

9.74° cant -- edge-more-parallel
53.6% effective aperture at β = 0°

9.74° fmp, n=1.586

50°-60°-70°, n=1.586

9.74° emp, n=1.586

50°-60°-70°, ρ = 0, n =1.586

50°-60°-70°, ρ = 0.25, n =1.586

50°-60°-70°, ρ = 0.5, n =1.586

50°-60°-70°, ρ = 0.75, n =1.586

50°-60°-70°, ρ = 1, n =1.586

50°-60°-70°, ρ = 0.5, 4 pins, n =1.586

50°-60°-70°, ρ = 0.5, 2 pins, n =1.586

53°- 60°- 67°, n=1.586

53°-60°-67°, ρ = 0.5, n =1.586

TRI-LEVEL CUBE CORNER RULING

This application is Divisional of U.S. application Ser. No. 10/320,738 filed Dec. 17, 2002, now U.S. Pat. No. 6,902,280.

This invention relates generally to retroreflective cube corners, and specifically to an array of quasi-triangular cube corners, ruled by three sets of equidistant, parallel, symmetrical vee-grooves. The array of cube corners achieves improved useful retroreflectance as unmetallized prisms by having the directions of ruling form three unequal angles, and having the three depths of ruling unequal for each cube corner.

BACKGROUND OF THE INVENTION

The applicant has observed the following properties of cube corner prism elements that are pertinent to the invention. These observations are discussed with respect to FIGS. 1-22, all of which are applicant-generated with the exception of FIG. 21. While the prior art is frequently referred to in this section, the interpretations and observations of the art are believed to be unique to the applicant.

Retroreflectors return light from a source to the source and its near vicinity. A retroreflective road sign appears hundreds of times brighter to the driver of a vehicle at night than a plain painted sign. By day, the sign is expected to be about as bright as a plain painted sign. If the sign returned the daytime illumination to its sources, sun and sky, it would be quite dark to the vehicle driver by day. The resolution of this paradox is that retroreflective road signs can be effective both night and day by failing to efficiently retroreflect light that arrives from some sources while efficiently retroreflecting light from other sources. Retroreflective road sign sheetings are the better for their ability to retroreflect vehicle lights at all their realistic positions, but to not retroreflect vehicle lights at nearly impossible positions.

The position of the illuminating source with respect to the road sign sheeting is generally described by two angles: entrance angle β and orientation angle ω. FIG. 1 shows a small rod r perpendicular to a road sign. Light beam e illuminates the sign. Entrance angle β is the angle between e and r. Light beam e casts a shadow s of rod r onto the sign. Entrance angle β could be determined from the length of shadow s. Orientation angle ω is determined by the direction of shadow s. ω is the angle from the nominal "up" direction of the sheeting on the sign to shadow s. The angle is measured clockwise, so in FIG. 1, ω equals approximately +65 degrees. If the beam of illuminating light is itself perpendicular to the sign, then entrance angle β=0 and there is no shadow, so ω has no meaning.

For road sign applications, the cases of large β are almost always cases where the sign is approximately vertical but is swiveled to face not in the direction of the source of illumination. The β values for these signs may be greater than 40°. The ω values in these cases are generally in the range 75° to 95° for signs on the right side of the road or in the range −75° to −95° for signs on the left side of the road. This is the basis for the importance of the plus and minus 90° values for ω.

Sheeting having good retroreflectance at large β also at 0° and 180° values of ω has a practical advantage. Sheeting is a roll good and there are economies to being able to use it either lengthwise or widthwise in sign fabrication. Thus the importance of the ω values −90°, 0°, 90° and 180°.

Retroreflectors are of two optical kinds. The first kind functions <refract, reflect, refract>. A first, curved refracting surface produces an image of the source on a second surface. The image surface is reflective, either specular or diffuse, so image light returns to the first refracting surface, and thence back toward the source. This type of retroreflector is exemplified by the half-metallized glass spheres comprising many road sign sheetings. The second kind of retroreflector functions <reflect, reflect, reflect>. When light enters a corner where three mirrors meet at right angles, it reflects off one, then another, and then the third mirror back towards the source. Likewise when light enters a prism cut as the corner of a cube it can reflect internally off the three cube faces and return in its original direction. Light enters and exits through a fourth prism face. The full sequence is <refract, reflect, reflect, reflect, refract>. Since the two refractions are at the same flat surface, the three reflections are what provide the retroreflection. This type of retroreflector is exemplified by the sub-millimeter prisms ruled in arrays in many road sign sheetings.

The prismatic retroreflector has advantages over the spherical retroreflector for road signs. Prisms can be packed more efficiently. Prisms can be less aberrant. Prisms can also be more selective about which source directions to retroreflect and which to not.

"Cube corner element" is defined as a region of space bounded in part by three planar faces, which faces are portions of three faces of a cube that meet at a single corner of the cube. The geometric efficiency of a retroreflecting cube corner prism depends on two main factors: effective aperture and combined face reflectance. Effective aperture is determined on the assumption that the second factor is perfect. The geometrical form of the cube corner prism and the refractive index of its material determine how much of the area occupied by the prism can participate in retroreflection for illumination of a particular β and ω. The refractive index figures in the effective aperture of the cube corner whenever β≠0°, because of the refraction at the entrance/exit surface.

Effective aperture may be found by ray-tracing. Another well-known method of determining effective aperture is illustrated in FIGS. 2A and 2B. FIG. 2A shows a view of a cube corner retroreflector in the direction of a light ray entering the cube corner. For β=0° illumination, this is simply a view of the cube corner normal to the front surface of the retroreflective sheeting. For any other illumination, the refraction of the incoming ray at the front surface must be taken into account when applying the method of the FIG. 2A.

FIG. 2A diagrams the kind of ray path that is required for a cube corner retroreflection. Illumination enters the cube corner on a ray and the cube corner is pictured as if viewed along that ray. The ray appears as point A in FIG. 2A. The ray reaches a point on face 1 shown at A. The ray then reflects from face 1 to another cube face. The path of this reflection, in the view of the Figure, must appear parallel to the cube dihedral edge 4, which is the dihedral edge that is not part of face 1. The reflected ray reaches face 2 at the point shown at B. Point B is constructed by making dihedral edge 6, the dihedral edge shared by faces 1 and 2, bisect line segment AB. From the point in face 2 shown at B the ray reflects to cube face 3. The path of this reflection, in the view of the Figure, must appear parallel to the cube dihedral edge 6, which is the dihedral edge that is not part of face 3. The reflected ray reaches face 3 at the point shown at C. Point C is constructed by making dihedral edge 4, the dihedral edge shared by faces 2 and 3, bisect line segment BC. From the point in face 3 shown at C, the ray leaves the cube corner in a direction parallel to its first arrival, accomplishing retroreflection. This ray appears as point C.

The shaded region of FIG. 2B shows what area of the cube corner of FIG. 2A is optically effective for retroreflecting illumination that has the direction of the view. This effective aperture is the collection of all points like point A, as described above, for which there is a point B, as described above, on a second face of the cube corner and also a point C, as described above, on a third face of the cube corner.

The cube corner apex appears at point O of FIG. 2A. By geometry, AOC is straight and AO=OC. The illumination entry point and the illumination exit point are symmetrical about the apex, in the diagram. For cube corners of triangular shape, with the three dihedral edges each extending to a triangle vertex, it can be proved that whenever such symmetrical points A and C lie within the triangle the intermediate point B must also lie within the triangle. Thus the diagrammatic method of FIG. 2A simplifies for triangular cube corners. The effective aperture can be found as the intersection of the cube corner triangle and this triangle rotated 180° about point O, as shown in FIG. 2C.

In determining the effective aperture by the diagrammatic method of FIG. 2A, faces are assumed to reflect like mirrors. Faces of a cube corner prism that are metallized do reflect like mirrors, although there is some loss of intensity by absorption at each reflection. For metallization with vacuum sputtered aluminum the loss is about 14%. The loss due to three such reflections is about 36%. Faces of a cube corner that are unmetallized may also reflect like ideal mirrors. Total internal reflection (TIR) involves zero loss in intensity. However, faces of a cube corner that are unmetallized may also reflect feebly. TIR requires that the angle of incidence upon the face exceed a certain critical angle. The critical angle is equal to the arc sine of the reciprocal of the refractive index of the prism material. For example, for n=1.5 material the critical angle is about 41.81°. Light incident at 41.82° is totally internally reflected. Light incident at 41.80° loses 11% of its intensity. Light incident at 41° loses 62% of its intensity. A cube corner prism with unmetallized faces may have one or two faces failing TIR for a particular incoming illumination.

The geometric efficiency of a retroreflecting cube corner prism depends also on the specular reflectance of the surface through which the light enters and exits the prism. This factor depends on the refractive index of the front surface material according to Fresnel's equations for dielectric reflection. The front surface material is often different from the prism body material. This factor in geometric efficiency will be ignored here, since it is independent of the prism design.

Geometric efficiency of an array of retroreflecting cube corners is not completely determined by the geometric efficiency of the individual prisms. Some light that is not retroreflected by one prism can travel to other prisms, generally-via total internal reflection off the front surface, and certain routes involving multiple cube corners produce retroreflection. This factor depends on the prism design as well as on the thickness of material between the prisms and the front surface. This factor is best studied by raytracing. Since the cube corners of the present invention do not differ greatly in their inter-cube effects from prior art cube corners, this factor is ignored in the descriptions.

The first factor in a cube corner prism's geometric efficiency, its effective aperture for a particular $\beta$ and $\omega$, is independent of its being metallized or not. The second factor in a cube corner prism's geometric efficiency, the product of the reflectances of its three faces for a particular $\beta$ and $\omega$, is greatly dependent on metallization or not. Typically, the combined face reflectance of aluminized cube corner prisms is about 64% with little dependence on $\beta$ and $\omega$. Typically, the combined face reflectance of non-metallized cube corner prisms is 100% for many $\beta,\omega$ combinations and less than 10% for many other $\beta,\omega$ combinations.

Retroreflective sheeting for road signs must not only retroreflect headlights at night but also have good luminance by day. Non-metallized cube corners are always preferred over metallized cube corners for road sign applications, because metallized cube corner sheeting appears rather dark by day. This darkness to the vehicle driver is in large part due to the combined face reflectance of the metallized prisms never being low, so they can better retroreflect sunlight and skylight back to sun and sky. By comparison, TIR frequently fails in a non-metallized prismatic sheeting, and then light leaks out of the prism. A white backing film behind the prisms diffusely reflects such light to eventually emerge nearly diffusely from the sheet.

K. N. Chandler, in an unpublished research paper for the British Road Research Laboratory entitled "The Theory of Corner-Cube Reflectors", dated October, 1956, charted the TIR limits for some non-metallized cube corner retroreflectors. FIG. 3 shows a square cube corner with four illumination directions labeled –90, 0, 90, 180 according to angle $\omega$. Shape is irrelevant to TIR limits, which depend solely on the tilts of the cube faces and the refractive index of the material.

FIG. 4 shows a diagram corresponding to FIG. 3, in the manner of Chandler's diagram. In FIG. 4, orientation angle $\omega$ (from –180° to 180°) is represented circumferentially and entrance angle $\beta$ (from 0° to 90°) is represented radially, and the three-branched curve shows the maximum $\beta$ at each $\omega$ for which TIR is maintained in the cube corner. A refractive index, n=1.586, was chosen for the example. FIG. 4 shows how the illuminating rays indicated +90 in FIG. 3 can be at any obliquity without there being TIR failure, while the light indicated –90 in FIG. 3 cannot exceed approximately 25° obliquity without TIR failure, and the light indicated 0 and 180 in FIG. 3 cannot exceed approximately 31° without TIR failure.

To alleviate the weakness at $\omega$=–90° shown in FIG. 4, cube corners were commonly paired as shown in FIG. 5. The two Chandler curves in FIG. 6, corresponding to the two cube corners in FIG. 5, show how the left cube in FIG. 5 "covers for" the right cube in FIGS. 3 and 6 at omega=–90°, with the opposite occuring at omega=+90°. However, FIG. 6 shows no improvement beyond the 31° entrance angle at omega=0°.

The Chandler diagram depends on just two things: the angles at which the interior rays meet the three cube faces and the critical angle of the prism material. Thus the only non-trivial methods for changing the Chandler diagram are change of the refractive index of the prism material and tilt of the cube corner with respect to the article front surface.

Increasing the refractive index swells the region of TIR in the Chandler diagram as shown in FIG. 7. To shift the directions of the region's arms requires canting the cube corner.

A cube corner prism element in sheeting is said to be canted when its cube axis is not perpendicular to the sheeting front surface. The cube axis is the line from cube apex making equal angles to each of the three cube faces. This line would be a diagonal of the complete cube. Rowland U.S. Pat. No. 3,684,348 discloses "tipping" triangular cube corners in order to improve their large entrance angle performance at the expense of their small entrance angle performance. When an array of cube corners is formed by three sets of parallel symmetrical vee-grooves, and the directions of grooving are not at 60° to one another, the cube corners are canted.

Heenan et al. U.S. Pat. No. 3,541,606 discloses non-ruled canted cube corners with attention to the direction of cant. He found that a retroreflector comprised of unmetallized hexagonal cube corners and their 180° rotated pairs could have extended entrance angularity in two orthogonal planes (i.e., at ω=−90°, 0°, 90°, and 180°) provided the cube corners were canted in a direction that make a cube face more nearly parallel to the article front surface. This effect was due to 100% combined face reflectance at large β for these ω values. FIG. 8 shows a plan view of a pair of 10° canted cube corners like those of FIG. 19 of Heenan et al. U.S. Pat. No. 3,541,606, except for being square rather than hexagonal. The cube axes, shown as arrows, show that the canting has been symmetrical between the two cube faces that were not made more parallel to the article front. The dihedral edge between those two faces, the cube axis, and a normal line from the cube apex perpendicular to the article front surface lie in a single plane, and said normal line lies between said dihedral edge and the cube axis.

Applicant has found it useful to construct diagrams like Chandler's, but for canted cube corners. In this application all such diagrams are called "Chandler diagrams". FIG. 9 is the Chandler diagram for the FIG. 8 pair of "face-more-parallel", abbreviated "fmp", cube corners formed in acrylic. FIG. 10 is the Chandler diagram for acrylic cube corners with fmp cant greater by 1.3°.

Hoopman U.S. Pat. No. 4,588,258 discloses applying the fmp cant to ruled triangular cube corners. The Chandler diagram generated for such ruled triangular cube corners is substantially the same as that obtained for Heenan et al. U.S. Pat. No. 3,541,606. Hoopman's cube corners have even better entrance angularity than Heenan's like canted cube corners because the triangular cube corners have greater effective aperture at large entrance angles than the hexagonal or square cube corners.

Heenan et al. U.S. Pat. No. 3,541,606 also discloses the "edge-more-parallel" canted cube corner, abbreviated "emp". FIG. 11 shows a pair of such cubes with 10° emp cant. The cube axes, shown as arrows, show that the canting is symmetrical between two cube faces in such a way that the dihedral edge between them becomes more parallel to the article front surface. Said dihedral edge, the cube axis, and a normal line from the cube apex perpendicular to the article front surface lie in a single plane, and the cube axis lies between said dihedral edge and said normal line. FIG. 12 is the Chandler diagram generated for acrylic n=1.49 cube corners of FIG. 11. FIGS. 9 and 12 show the respective earmarks of face-more-parallel and edge-more-parallel cant. The symmetrical Chandler diagram from FIG. 6 is compressed in FIG. 9 and stretched in FIG. 12. Comparing FIGS. 6, 9, and 12, the diagramatic area of TIR is greatest in FIG. 6 and least in FIG. 9. However, the TIR region in FIG. 9 contains the most useful β,ω pairs.

Smith et al. U.S. Pat. Nos. 5,822,121 and 5,926,314 disclosed the ruling of arrays of cube corners by means of three sets of parallel symmetrical vee-grooves to equal depth, the grooves having directions such that between no two are the angles the same. The cube corners have the shapes of scalene triangles. Applicant has observed that the cube axes are necessarily canted, but the cant is neither fmp nor emp. FIG. 14 shows a plan view of a pair such cube corners with cant 9.74°. For each cube, the cube axis, shown as an arrow, show that the canting is not symmetrical between any two cube faces. The there is no dihedral edge in a plane together with the cube axis and a normal drawn from the cube apex to the article front surface. In this application, such cant is called "compound cant".

FIGS. 13A and 13B explain the shape of the Chandler diagram for a compound canted cube corner. FIG. 13A is the same plan view, normal to the article front surface, of one of the cube corners of FIG. 14, but the heavy arrows are different from the arrows of FIG. 14. The heavy arrows FIG. 13A follow the altitudes of the triangle and indicate the illumination orientation angles which, for a given entrance angle, make the smallest incidence angles upon the cube faces. For a given entrance angle, for all orientation angles of illumination, that along the arrow marked a will reach the face marked a at the smallest incidence angle because it alone has just one dimension of obliquity. Thus TIR will fail at face a for this orientation angle at a smaller entrance angle than at other orientation angles. FIG. 13B is the Chandler diagram for the cube corner of FIG. 13A. The arrow marked a in FIG. 13B corresponds to the arrow marked a in FIG. 13A. Arrow a in FIG. 13B points to the minimum β on that arcuate portion of the Chandler diagram that indicates where face a of FIG. 13A fails TIR. The arcuate portion is symmetrical about arrow a.

Applicant has found that if one edge of the triangle cube corner is made upright as in FIG. 13A, then if the triangle has angles A and B on that edge as shown in the Figure, elementary geometry determines that the Chandler diagram will have its three limbs centered at approximately the three ω angles:

$$\omega_1 = 90° - A - B;$$

$$\omega_2 = 90° + A - B;$$

$$\omega_3 = 90° + A + B. \qquad (1)$$

For the example of FIG. 13A, angle A=50° and angle B=60°, so the three Chandler limbs are centered on approximately −20°, 80°, and 200°. Of greater importance are the three angles separating the three limb directions. These are approximately:

$$\Delta\omega_1 = 2A;$$

$$\Delta\omega_2 = 2B;$$

$$\Delta\omega_3 = 360° - 2A - 2B,$$

or $\Delta\omega_3 = 2C$, where C is the third angle of the triangle. (2)

It is desirable to have two limbs about 90° apart. According to the above relations, this requires one of the plan view triangle angles to equal 45°. Applicant has observed that this is not possible with a face-more-parallel canted isosceles triangular cube corner, since the triangle would be 45°-45°-90° implying that the plan view is squarely upon one face. Limbs 100° apart is good enough. This requires the triangle to be 50°-50°-80° which implies a cant of about 21.8°. The consequence of such large cant is a failure of TIR at β=0°. FIG. 16 shows how even a 16° face-more-parallel cant, with even a very high refractive index n=1.63, nearly fails TIR at β=0°.

Applicant has further observed that Chandler limbs 90° apart is possible with a edge-more-parallel canted isosceles triangular cube corner, by making the triangle, 67.5°-67.5°-45°. This corresponds to approximately 10.8° cant. FIG. 12 shows the Chandler diagram for nearly this cube corner.

There are problems involving the effective aperture at large β for emp designs, as will be discussed later.

Chandler limbs 90° apart is possible with a scalene triangular cube corner, such as the one with A=45°, B=60°, C=75°. It is more practical to make limbs 100° apart with A=50° as in FIG. 13A.

FIG. 14 illustrates the cube corner of FIG. 13A with a neighbor cube corner. Dashed arrows indicate the cube axes in the plan view. FIG. 15 illustrates how the Chandler diagrams for the two cube corners cover for each other. Rotating these cube corners approximately 10° counterclockwise rotates the Chandler diagram likewise. Then there is possibility of good entrance angularity for ω=−90°, 0°, 90°, 180°.

FIG. 15 more resembles FIG. 9 than it resembles FIG. 12. In FIGS. 15 and 10, the six Chandler limbs are beginning to converge to four limbs. Applicant has observed that it can be shown that in general the six limbs are spaced according to 180°—2A, 180°—2B, and 180°—2C. Thus limb convergence is a result of one of the angles A, B, C being especially large. The isosceles triangle edge-more-parallel cube corner cannot have any angle especially large since its two largest angles are equal.

FIGS. 17A-17F are plan views of cube corners seen normal to the front surface of the sheeting, and the corresponding, Chandler diagrams for paired cube corners. All the cube corners are canted by 11.3°, with the axis in plan view shown as a short arrow. The figures illustrate the continuum of cants from face-more-parallel of 17A to the edge-more-parallel of 17F. The isosceles triangle of FIG. 17A passes through scalene triangles to the isosceles triangle of FIG. 17F. Applicant has observed that in FIG. 17A, one face, indicated mp, is especially vulnerable to TIR failure because it is especially parallel to the sheeting front surface. In FIG. 17F, two faces, each indicated mp, are vulnerable to TIR failure because they are especially parallel to the sheeting front surface. The two faces flank the edge that is canted more parallel to the sheeting front surface. It is artificial to classify all cants as either face-more-parallel or edge-more-parallel as was attempted in Heenan et al. U.S. Pat. No. 6,015,214, since the optical characteristics must change continuously between face-more-parallel and edge-more-parallel.

Ruled triangular cube corners are useful for illustrating the continuum between face-more-parallel and edge-more-parallel cant, but cube corner cant is independent of cube corner shape. Cant is evident from the plan view, perpendicular to the sheeting surface, of the three angles formed at the cube apex. If D and E are two of the three angles formed around the apex in this view, and if d=−tan D and e=−tan E, then the cant is given by equation (3) which is equivalent to an equation in Heenan et al. U.S. Pat. No. 6,015,214.

$$cant = \arccos\left(\frac{1}{\sqrt{3de}}\left[1+(\sqrt{d}+\sqrt{e})\sqrt{\frac{de-1}{d+e}}\right]\right) \quad (3)$$

For ruled triangular cube corners, the triangle's three angles are simply the supplements of the angles in the plan view about the cube apex. For example, in FIG. 17C, the angle marked A plus the angle marked D must equal 180°.

Applicant provides the following five definitions of terms about cube cant:

Cube axis: The diagonal from the corner of a cube, said cube and its corner underlying the cube corner element.

Canted cube corner: a cube corner having its axis not normal to the sheeting surface. Cant is measured as the angle between the cube axis and the sheeting surface normal. Comment: when there is cant, a plan view normal to the sheeting surface shows the face angles at the apex not all 120°.

Edge-more-parallel cant: cube corner cant such that the cube axis, one of the dihedral edges, and a normal from the cube corner apex to the sheeting surface lie in one plane and the normal is between the cube axis and the dihedral edge. Comment: when cant is emp, a plan view normal to the sheeting surface shows two of the face angles at the apex equal, and smaller than the third face angle at the apex.

Face-more-parallel cant: cube corner cant such that the cube axis, one of the dihedral edges, and a normal from the cube corner apex to the sheeting surface lie in one plane and the dihedral edge is between the cube axis and the normal. Comment: when cant is fmp, a plan view normal to the sheeting surface shows two of the face angles at the apex equal, and larger than the third face angle at the apex.

Compound cant: cube corner cant such that the cube axis, one of the dihedral edges, and a normal from the cube corner apex to the sheeting surface do not lie in one plane. Comment: when there is compound cant, a plan view normal to the sheeting surface shows no two of the face angles at the apex equal.

Arrays of cube corners defined by three sets of parallel symmetrical vee-grooves ruled to equal depth are triangular cube corners. For these cube corners the triangle shape determines the cant and the cant determines the triangle shape. Cant is indicated by the angles in the plan view about the cube apex. Applicant has made the following observations with respect to cant and effective aperture. Cant determines, in conjunction with the index of refraction of the prism material, the effective aperture for each β,ω pair. FIGS. 18A shows an uncanted triangular cube corner and FIGS. 18B-D show three different triangular cube corners each having 9.74° of cant. Effective apertures are indicated for β=0°, at which angle the refractive index has no effect. The 9.74° canted cube corners have from 50% to 53.6% effective aperture at β=0°, compared with 66.7% for the uncanted cube corner. The triangles in FIGS. 18A-D are drawn with equal areas. When expressed as a fraction or percentage, "effective aperture" means the area of the cube corner that can participate in retroreflection divided by the area that the cube corner occupies in the array.

Through either geometric construction or by ray tracing, the effective aperture may be determined for arbitrary beta and omega. FIGS. 19A-F illustrate applicant's observations as to how the effective aperture of some triangular prism cube corners, refractive index 1.586, changes with β for four different ω's:

−90°; 0°; 90°; 180°; FIG. 19A for cant 0°; FIG. 19B for cant 9.74° fmp; FIG. 19C for the compound 9.74° from a 50°-60°-70° triangle; FIGS. 9D and 19E for 9.74° emp. FIGS. 19A-F are each for a single cube corner. There is an area of sheeting front surface corresponding to the whole cube corner prism. The calculation of fractional or percent effective aperture is on the basis of this area projected in the direction of illumination, that is, multiplied by the cosine of beta.

FIGS. 20A, 20B, and 20C are Chandler diagrams and plan views for the canted cube corners from FIGS. 19B, 19C, and 19D&E respectively. The triangular cube corner of FIG. 20B has no symmetry plane so it is unobvious how to define 0° or 90° omegas. The cube corner was rotated to make the thickest limb of its Chandler diagram center on 90° omega. Note that the entrance angularity is large near 180° omega but not near 0° omega. The pair cube, which takes care of −90° omega also takes care of 180°. This exploiting of asymmetry is the trick for improved entrance angularity with such cube corners.

All the curves in FIG. 19A for the uncanted cube corner show effective apertures decreasing with increasing beta. Each of FIGS. 19B-F, for the canted cube corners, have at least one curve showing effective aperture initially increasing with increasing beta. The 9.74° fmp cube has this for omega=90° (FIG. 19B). The 50-60-70 cube has this for omega=0° and 90° (FIG. 19C). The 9.74° emp cube has this for −90° (in FIG. 19D).

Chandler diagrams indicate for which β and ω values the combined face reflectance is high. This is a necessary, but not sufficient condition, for high retroreflectance. The other factor is effective aperture. Comparing FIGS. 19A-E and corresponding FIGS. 20A-C allows quick appraisal of designs. In particular, comparing FIGS. 19D and 19E with FIG. 20C reveal problems with the 9.74° emp cube corner. The Chandler diagram limits beta to just 42.8° for omega=−90°. Thus the highest effective apertures shown in FIG. 19D are wasted. The Chandler diagram shows unlimited beta for omega=+90°, where FIG. 19D shows a weak effective aperture curve. The Chandler diagram shows unlimited beta also for omegas −45° and −135° (indicated as 225°). FIG. 19E shows a weak effective aperture curve for these two omegas. FIG. 19E shows a strong effective aperture curve for omegas +45° and +135°, but FIG. 20C shows that TIR is limited to beta=19.7° in those directions. The 9.74° emp cube corner is a dunce among canted cube corners for such discoordination of the two factors.

The 9.74° fmp canted triangle cube corner has better luck. Its high curve of effective aperture in FIG. 19B is for omega=+90°, for which omega the cube, according to FIG. 20A, sustains TIR throughout the entrance angles. Its middling curves for effective aperture in FIG. 19B are for omega=0° and 180°, which show middling TIR sustenance in FIG. 20A. Its weakest curve for effective aperture in FIG. 19B is for omega=−90°, for which angle TIR is strongly truncated according to FIG. 20A. The omega=−90° will be covered by the mate cube. Hoopman U.S. Pat. No. 4,588,258 discloses fmp canted triangular cube corner pairs having a broad range of entrance angularity for all four omegas: −90°; 0°; 90°; 180°. Applicant has observed that this is due to the advantageous coordination of the two geometrical factors.

Applicant has observed that the most harmonious interaction of the two geometrical factors occurs for the compound canted triangle cube corner exemplified by the 50°-60°-70° prism of FIGS. 19C and 20B. As with the fmp canted cube corners of FIGS. 19B and and 20A, the highest curve of FIG. 19C is for omega=+90°, for which omega the cube, according to FIG. 20B, sustains TIR throughout the entrance angles. Also corresponding to the fmp canted cube example, the weakest curve of FIG. 19C is for omega=−90°, for which angle TIR is strongly truncated according to FIG. 20B. The compound canted cube corner differs from the fmp cube corner in that FIG. 19C has separate curves for omega=0° and omega=180°, respectively low and high, while FIG. 19B has a single middling curve. FIG. 20B shows that TIR is truncated at β=34.9° for the omega=0° direction while TIR is sustained to β=72.9° for the omega=180°. There is beautiful coordination between FIGS. 19C and 20B. The omega=−90° and omega=0° directions will be covered by the mate cube. Smith et al. U.S. Pat. Nos. 5,822,121 and 5,926,314 disclose scalene triangular cube corner pairs having a broad range of entrance angularity for all four omegas: −90°; 0°; 90°; 180°.

Retroreflective sheetings must be thin to be flexible, so the cubes must be small, on the order of 150 µm to 750 µm deep. Cubes of this size diffract light within a spread of angles relevant to roadway performance. Thus diffraction analysis of sheeting cube optical designs is necessary. Small active areas imply large diffraction patterns. In general, a design in which one of a pair of cubes sustains large active area, while the other dies, is preferable to a design in which both of a pair of cubes sustain middling active areas, totaling as much as the first design. For this and other reasons given, the compound canted triangle cube corner prism is advantageous over the fmp and emp types.

FIG. 18A-D and again FIGS. 19A-E show that the effective aperture for the canted examples for β=0° is between three-fourths and four-fifths of the effective aperture of the uncanted cube corner for β=0°. Since a majority of road sign uses have β always near 0°, this is a serious defect of the canted examples. The defect at β near 0° can be reduced by canting much less, that is, by compromising with the uncanted cube corners. Thus Szczech U.S. Pat. No. 5,138,488 discloses the performance of 4.3° fmp canted cube corner prisms. However 4.3° of cant, with pairing, with moderate refractive index such as 1.586, is too little cant to provide large entrance angularity in all four omega directions: −90°, 0°; 90°; 180°.

FIG. 21 is identical to FIG. 31 of Heenan et al. U.S. Pat. No. 6,015,214. It shows a two part tool comprising a non-rulable array of triangular cube corners. The tool would be repeated many times, adjoining at faces like that marked 124, for making a full tool. The front surface of the sheeting produced will be perpendicular to the lines shown vertical in FIG. 21. Supposing that the triangular bases in FIG. 21 are equilateral, and supposing that angle x equals 9.74°, then the cube corners are alternately canted 9.74° fmp and 9.74° emp. However they do not look like the ruled triangles with corresponding cants in FIGS. 18B and 18D. FIG. 22 shows a plan view, normal to the sheeting, of the alternating fmp and emp cube corners, that would result from the tool of FIG. 21. Each cube corner has effective aperture of 62.7% at β=0°. This compares favorably to 50.0% for the ruled 9.74° fmp cube corner of FIG. 18B and also to 53.6% for the ruled 9.74° emp cube corner of FIG. 18D. Heenan et al. U.S. Pat. No. 6,015,214 did not disclose or suggest these advantages in effective apertures for the triangular cube corners of FIG. 21. The first advantage should be understood as a geometrical consequence of making the singular edge of the fmp triangle less deep than the rest of the triangle. The second advantage should be understood as a geometrical consequence of making the singular edge of the emp triangle deeper than the rest of the triangle. Depth is regarded viewing downward upon the tool in FIG. 21.

Mimura et al. U.S. Pat. No. 6,083,607 and 6,318,866 B1 disclose that if the ruling of emp triangular cube corners is modified to make the sharp groove, corresponding to the isosceles triangle's short edge, deeper than the other two grooves, this generally improves the effective aperture. Mimura et al. U.S. Pat. No. 6,390,629 B1 discloses that if ruling of fmp triangular cube corners is modified to make the blunt groove, corresponding to the isosceles triangle's long edge, deeper than the other two grooves, this generally improves the effective aperture.

Hexagonal or rectangular cube corners generally have 100% effective aperture at β=0°, which falls rapidly with increasing β. Heenan et al U.S. Pat. No. 6,015,214 discloses decentering the apex in a hexagonal or rectangular cube corner in order to improve retroreflectance at large β while sacrificing retroreflectance at small β. Decentering the apex does not affect the Chandler diagram, but strongly affects the effective aperture for various β and ω. Triangular cube corners have relatively small effective aperture for small β. An uncanted triangle cube corner has only 66.7% effective aperture for β=0°. More desirably canted triangle cube corners are weaker yet for β=0°.

The purpose of this invention is to improve the effective apertures of the most desirably canted triangular cube corners. The above discussion has identified these as triangular cube corners having compound cants, rather than the face-more-parallel or edge-more-parallel cants. The technique for improving the effective aperture involves ruling the defining grooves to three different depths so as to displace the apex of the cube corner towards the centroid of the triangle describing the groove paths, all as seen in plan view.

SUMMARY OF THE INVENTION

The invention encompasses an array of cube corner elements defined by three sets of parallel vee-grooves, the directions of the three groove sets making three angles no two of which are equal. Additionally, when the array is viewed in plan in a direction normal to the array, lines along the roots of the grooves determine a pattern of triangles in which the apices of the cube corners lie at distances from their respective triangle's centroid that is substantially less than the distance between the triangle's orthocenter and its centroid. The cube corners may be male, micro-cube corners formed in a transparent material and having a second substantially flat surface, and so may be retroreflective of light entering the second surface. The cube corners of the invention are intended to be unmetallized prisms.

In one embodiment of the invention, the roots of the three sets of vee-grooves lie in three distinct parallel planes. In another embodiment of the invention, the three sets of vee grooves do not lie in three parallel planes, but the grooves of one set are generally deeper than those of a second set which are generally deeper than those of the third set, depth being with respect to a reference plane. In one embodiment, the depths in the shallow set are no more than 90% of the depths in the intermediate set, which are no more than 90% of the depths of the deep set.

In each embodiment, the typical cube corner is defined by three vee-grooves having different included angles. The bluntest vee-groove is at the shallowest depth, the intermediate vee-groove is at the intermediate depth, and the sharpest vee-groove is at the greatest depth.

It is because the groove directions make no two angles equal that the cube corner has a desirable compound cant, and because the groove depths are made unequal in the manner described that the geometric efficiency closely approaches that of uncanted triangular cube corners at the smaller entrance angles. Varying the three groove depths can displace the cube apex anywhere within the triangle formed by the lines of the groove roots, all in plan view. With equal groove depths, the apex appears at the triangle's orthocenter. The invention considers in detail the efficiencies of displacing the apex along the line from the triangle's orthocenter to its centroid. Geometric efficiency easily exceeds 60% for 0° entrance angle over most of the line segment. Excellent efficiencies for a wide range of entrance angles, at the needed orientation angles, without excessively deep cuts, are achieved when displacement is between ¼ and ¾ of this line segment. A preferred embodiment has the apex displaced half way from the orthocenter to the centroid.

The basic inventive cube corner arrays can produce very high entrance angularity in the four most important directions ω=−90°, 0°, 90°, 180°. For improved symmetry, but still with emphasis on these four 107 values, these arrays can be "pinned", assembling sub-arrays with like sub-arrays differing by 90° of rotation, or by mirroring.

Finally, the use of three sets of parallel, equidistant, symmetrical vee-grooves to define the shapes of the inventive cube corners allows the master tools to be made easily and accurately, and the simplicity of the overall topographic structure allows plastic retroreflective sheeting to be made efficiently and cost effectively.

DETAILED DESCRIPTION OF THE INVENTION

Two geometrical theorems are useful for explaining the invention.

Figure 23:
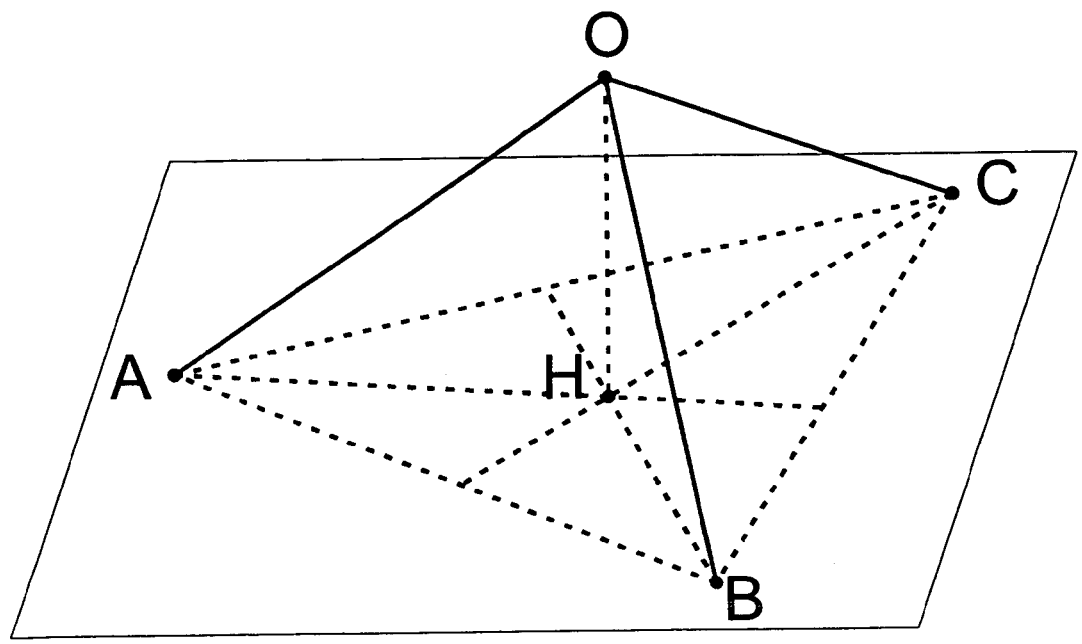
FIG. 23 illustrates theorem 1 in the specification.

Theorem 1 (FIG. 23). For any three points A, B, and C in a plane there is one and only one point O above the plane such that AO, BO, and CO are mutually perpendicular. Furthermore, a perpendicular from O to the plane finds the orthocenter of triangle ABC, that is, point H where the three altitudes of triangle ABC meet.

Figure 24:
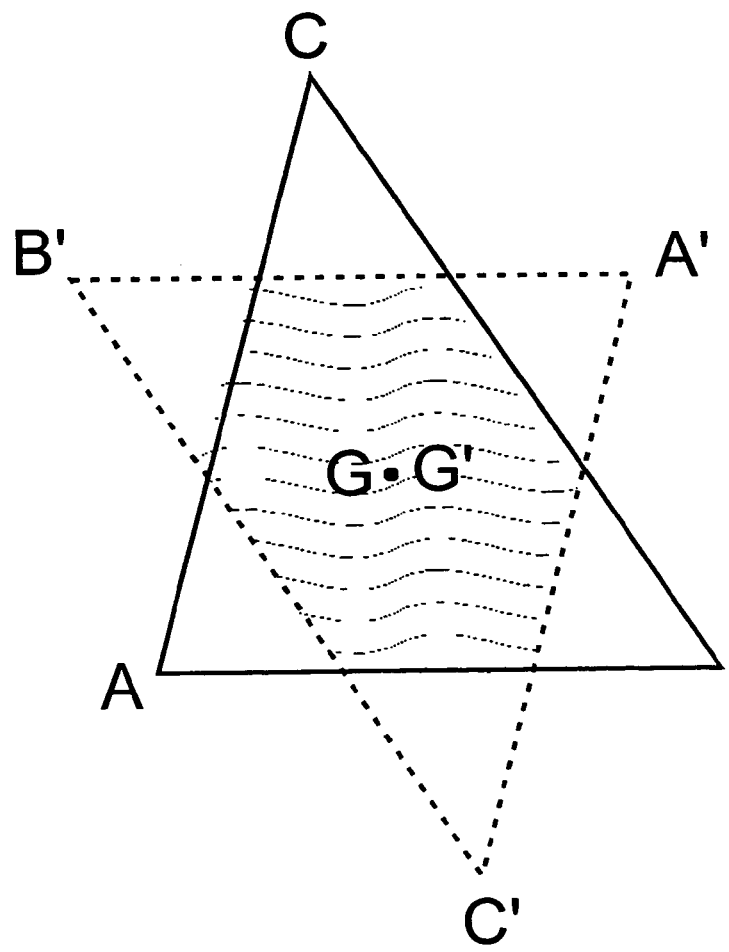
FIG. 24 illustrates theorem 2 in the specification.

Theorem 2 (FIG. 24). In a plane, if ABC is any triangle and A'B'C' is the same triangle rotated 180° about some point in the plane, then the greatest possible area of intersection of the two triangles is ⅔ the area of one triangle, and this occurs only when the rotation is about the centroid of triangle ABC, that is, about the point G where the three medians of triangle ABC meet. The centroid of triangle A'B'C' is at the same point.

Theorem 1 implies that whenever a triangular cube corner is viewed normal to the plane of the triangle, the cube corner's three dihedral edges appear as the three altitudes to the triangle and the cube corner's apex appears at the triangle's orthocenter. For ruled triangular cube corners this view corresponds to β=0° illumination.

Theorem 2 implies that in order for ruled triangular cube corners to have large effective aperture for β=0° illumination, its apex should appear at the triangle's centroid when viewing normal to the plane of the triangle.

Figure 25:
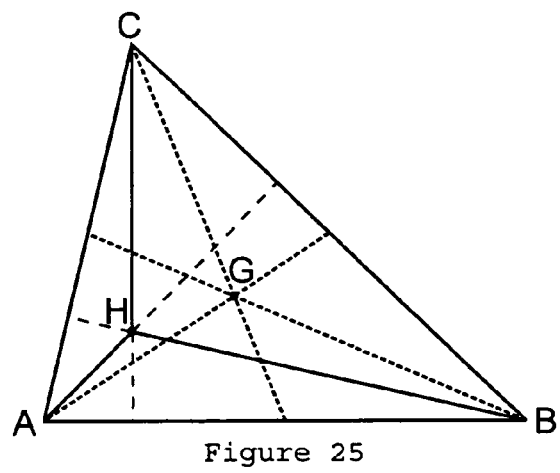
FIG. 25 illustrates how for a non-equilateral triangle, the orthocenter is distinct from the centroid.

For non-equilateral triangles, the orthocenter is distinct from the centroid. FIG. 25 shows orthocenter H quite far from centroid G for a triangle corresponding to a compound canted triangular cube corner. Thus Theorem 2 says the cube corner apex should be located somewhere Theorem 1 says it won't be.

The cube corner arrays of this invention are rulable, that is, they can be generated by the repeated straight-line motion of shaped tools along paths parallel to a common plane, called the ruling plane. In particular the tools cut symmetrical vee-grooves defining the cube corner arrays of this invention.

Figure 26A:
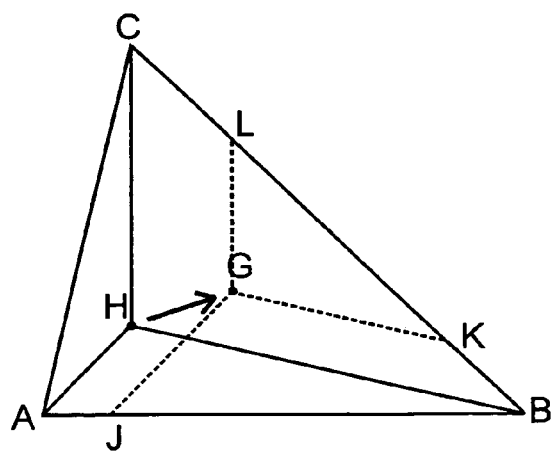
FIGS. 26A and 26B illustrate how the apex of a cube corner defined by a scalene triangle might be favorably displaced by tri-level ruling.

Points ABCH of FIG. 26A, corresponding to those of plane FIG. 25, illustrate a solid cube corner with apex H. Point G of FIG. 25, reappears in FIG. 26A as a possible new location for the apex. FIG. 26A illustrates schematically how a cube corner apex might be displaced while the three cube corner faces remain parallel to their three original planes. The meeting of dihedral edges at new apex H looks identical to the meeting of dihedral edges at original apex G. The compound cant has been preserved. The angles A, B, and C of triangle ABC are respectively 76.9°, 43.9°, and 59.2°. The same approximately 103.8° vee-groove cutter that formed face HBC can form a face like schematic GKL by cutting to a lesser depth. The same approximately 43.7° vee-groove cutter that formed face HCA can form a face like schematic GLCAJ by cutting to a greater depth. The same approximately 58.9° cutter that formed face HAB can form a face like schematic GJBK by cutting to an intermediate depth.

Figure 26B:
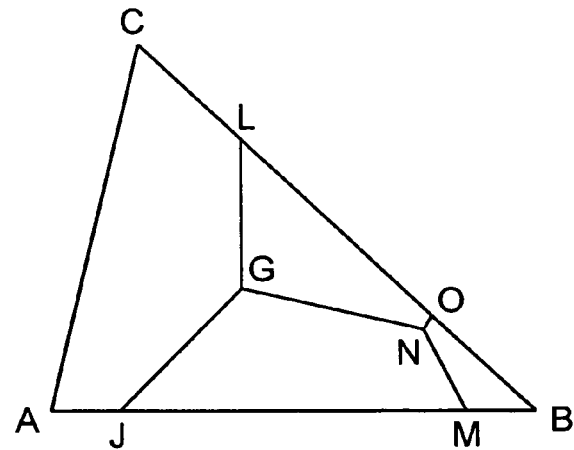

FIG. 26B illustrates how nearly the schematic FIG. 26A is realized by such tri-level ruling. Regarding length CB as 1 and the apex G as at depth 0 in FIG. 26B, the deepest, sharpest vee-groove, shown along CA, has depth 0.809, the shallowest, bluntest vee-groove, shown along OL, has depth 0.181, and the intermediate vee-groove, shown along JM, has depth 0.464. The deepest, sharpest groove forms apparently 5-sided face GLCAJ as in FIG. 26A. The shallowest bluntest vee-groove does not form trilateral face GKL as in FIG. 26A, but rather a quadrilateral face GNOL. The intermediate depth, intermediate width vee-groove does not form quadrilateral face GJBK as in FIG. 26A, but rather quadrilateral face GJMN. In addition there is an apparently quadrilateral facet MNOB. This facet does not belong to the cube corner. It was formed by the opposite half of the sharpest, deepest vee-groove cutter that formed face GLCAJ when it made a different groove, namely that at point B.

For the cube corner with apex G in FIG. 26B, each of the cube faces has two dihedral edges and one or more non-dihedral edges. It is seen that the longest edge of each cube face is a non-dihedral edge along the root of the vee-groove defining that face. The expression "long face edges" of a cube corner refers to the longest edges of each of the faces.

Figure 27:
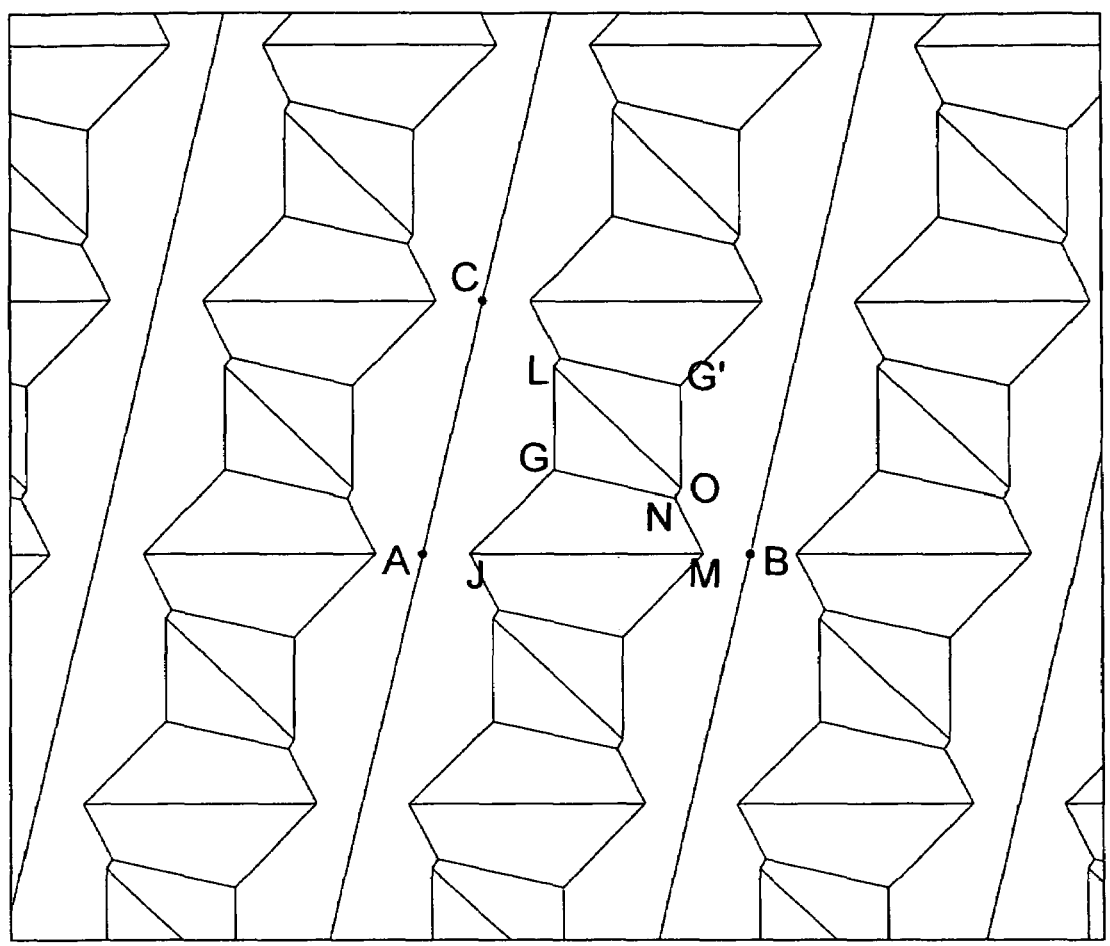
FIG. 27 is a plan view of a tri-level ruled array of cube corners of the invention, including FIG. 26B.

FIG. 27 eliminates the artificiality of viewing the cube corner of FIG. 26B as triangular by showing it within a ruled array. None of the triangle's vertices A, B, C are distinguished points in the plan view of the array. Triangle ABC may be located in the array, and associated with the cube corner having vertex G, but the face having angle LGJ at the apex extends beyond the triangle ABC, and an area MNOB of the triangle cannot participate in retroreflection by the G cube corner but does participate, although weakly, in retroreflection of illumination with certain β and ω, by the neighbor cube having vertex G'. The cube corners of this invention are not strictly triangular, and are called "quasi-triangular".

The inventive cube corners differ from those of Mimura et al. U.S. Pat. Nos. 6,083,607, 6,318,866 B1, and 6,390,629 B1 in having compound cant, rather than emp or fmp cant. In consequence no two of the inventive cube corner's faces are congruent and no two of the defining groove depths agree.

Figure 28:
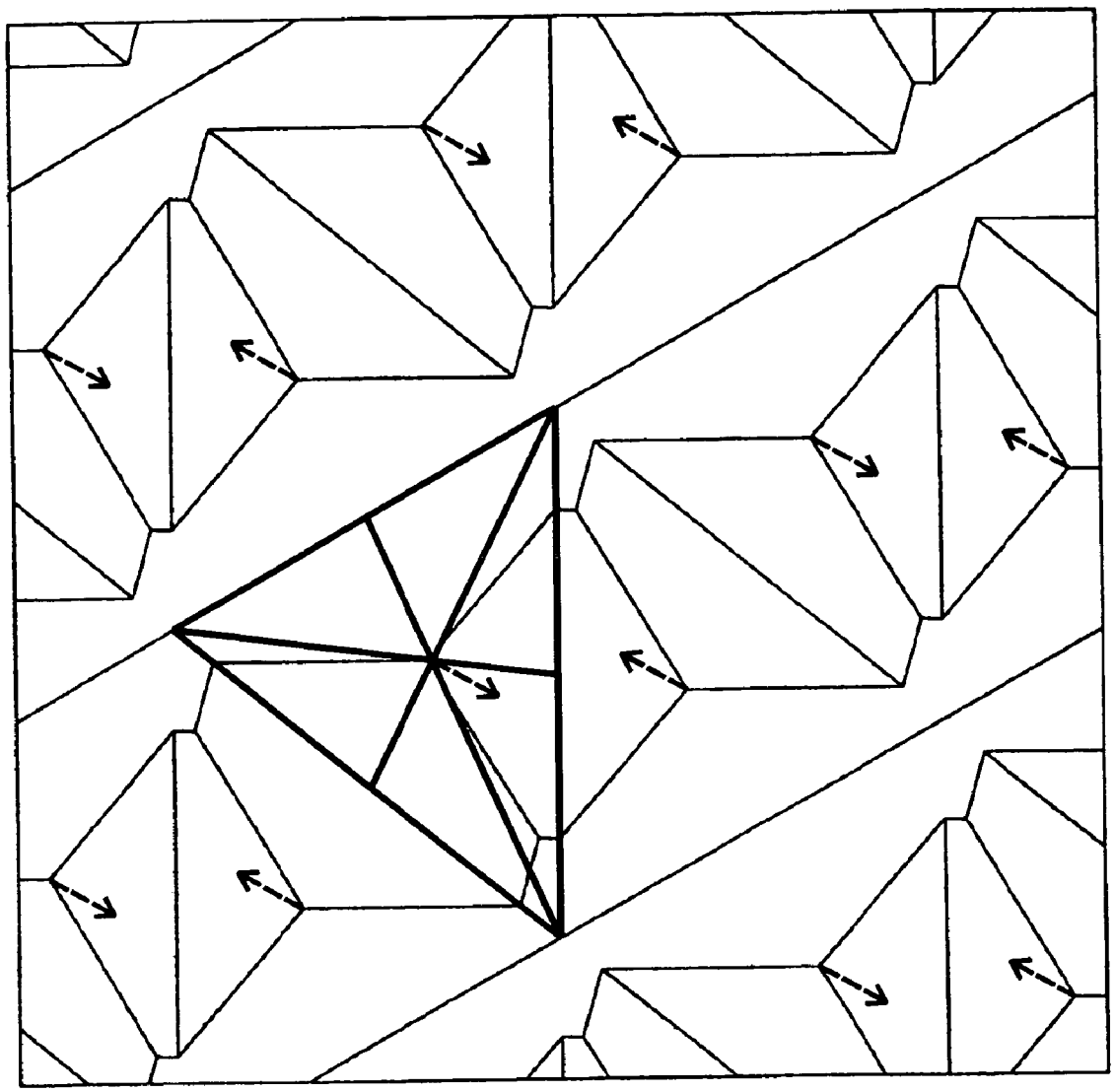
FIG. 28 is a plan view of a tri-level ruled array of cube corners of the invention with a 50°-60°-70° triangle and its centroid superimposed.

The cube corner design of FIG. 26B and FIG. 27 has a very large 17.6° compound cant and is given primarily to illustrate the inventive concept of apex displacement by tri-level ruling. FIG. 28 illustrates a similar application of the method of apex displacement to the more practical 9.74° canted cube corner illustrated in FIGS. 13A, 14, 18C, and 20B. The grooving directions were at 50°, 60°, and 70° to one another, and the grooving depths were chosen to displace the cube apex. FIG. 28 shows the cube corner array and includes a superimposed 50°-60°-70° triangle with its medians showing that the apex was displaced to the centroid of the triangle.

FIG. 28 also shows the directions of each of the cube axes. Opposing neighbors are adjacent and have faces that are opposite sides of one vee-groove. The axis of each cube corner is skew to the axes of its three opposing neighbors.

Figure 29:
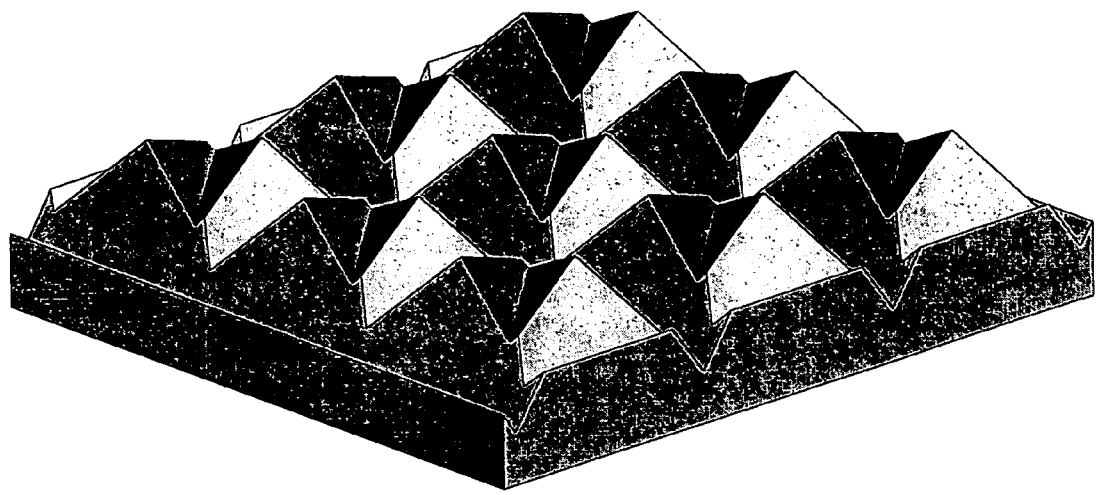
FIG. 29 is a perspective view of a portion of the cube corner array of FIG. 28.

FIG. 29 is a perspective view of a portion of the same cube corner array. The deepest groove is seen on the left side, the intermediate groove on the right side, and the shallowest groove is seen up the middle of FIG. 29. FIG. 28, like all the plan views, is a view into a cube corner, so it is a view through the flat underside of the solid illustrated in FIG. 29.

By suitable tri-level ruling the apex can be displaced to anywhere in the triangle. In the present invention, the displacement is toward the centroid, but not necessarily to the centroid. In a plan view of a triangular cube corner of the desired compound cant, such as FIG. 25, a straight line may be drawn connecting the orthocenter H and centroid G. The family of designs in which the apex is displaced along the line from H to G is parameterized by the fraction ρ. ρ=0 describes the prior art design with no apex displacement. ρ=1 describes the design with apex displaced to the triangle's centroid. It has been found that displacements in the range ρ=0.25 to ρ=0.75 are preferred for the preferred compound cants. Also it has been found that displacing the apex to a point Q off the line HG has no practical advantage or disadvantage over displacing it to a point that is on the line HG and near Q.

Figure 30A:
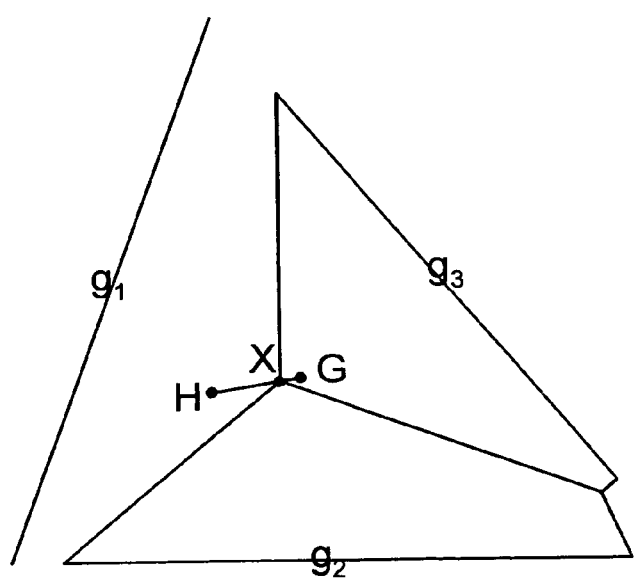
FIG. 30A illustrates a quasi-triangular cube corner of the invention with displacement parameter ρ=0.75.

FIG. 30A shows the ρ=0.75 quasi-triangular cube corner based on the 50°-60°-70° triangle. In space, groove roots $g_1$, $g_2$, and $g_3$, being at three different levels, have no intersections, even when extended. But in the plan view of FIG. 30A, the extended roots form the same 50°-60°-70° triangle as they would have formed if they were of equal depth. Point H is the orthocenter, and point G the centroid, of this triangle. In the plan view, the cube corner apex X is seen to be displaced 75% of the way from H to G. ρ=HX/HG=0.75.

Figure 13A:
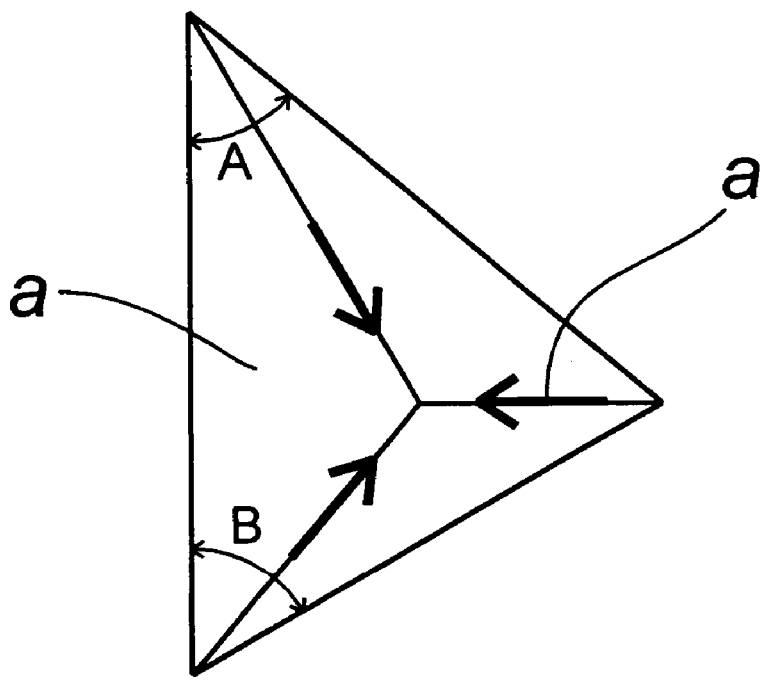
FIG. 13A is a plan view of a triangular cube corner of the prior art, wherein the heavy arrows follow the altitudes of the triangle and indicate the illumination orientation angles that, for a given entrance angle, make the smallest incidence angles upon the cube faces.
Figure 13B:
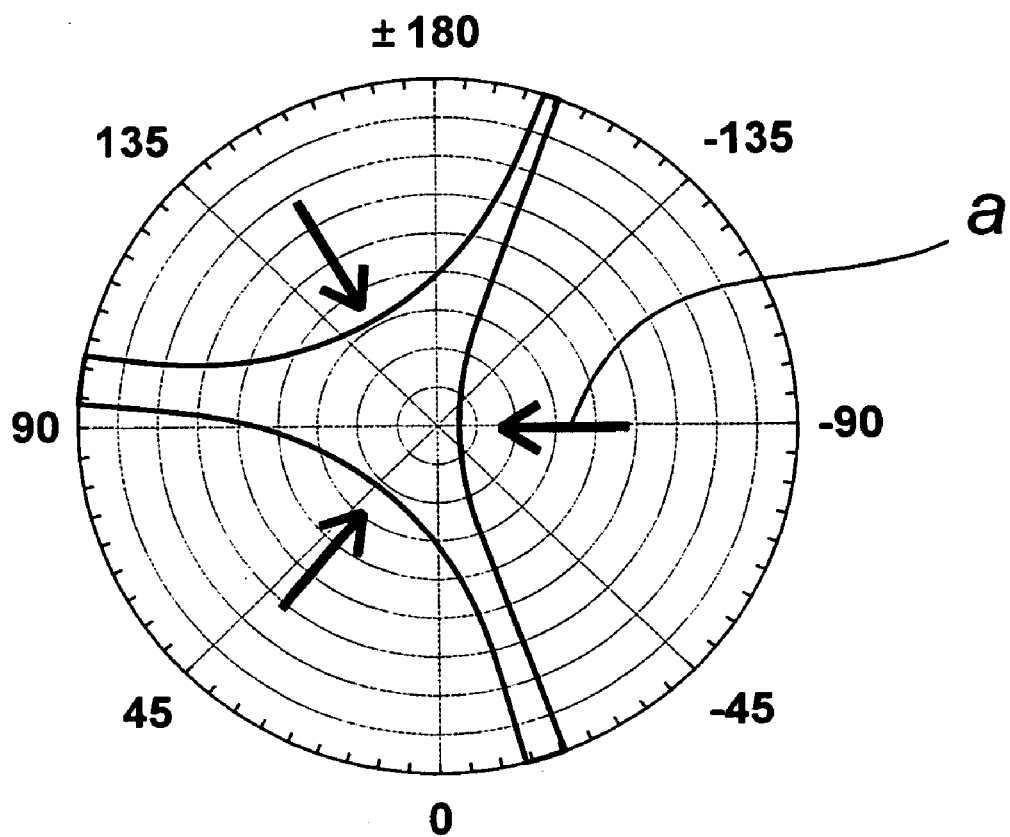
FIG. 13B is the Chandler diagram for the cube corner of FIG. 13A wherein the arrows correspond to the arrows in FIG. 13A.
Figure 14:
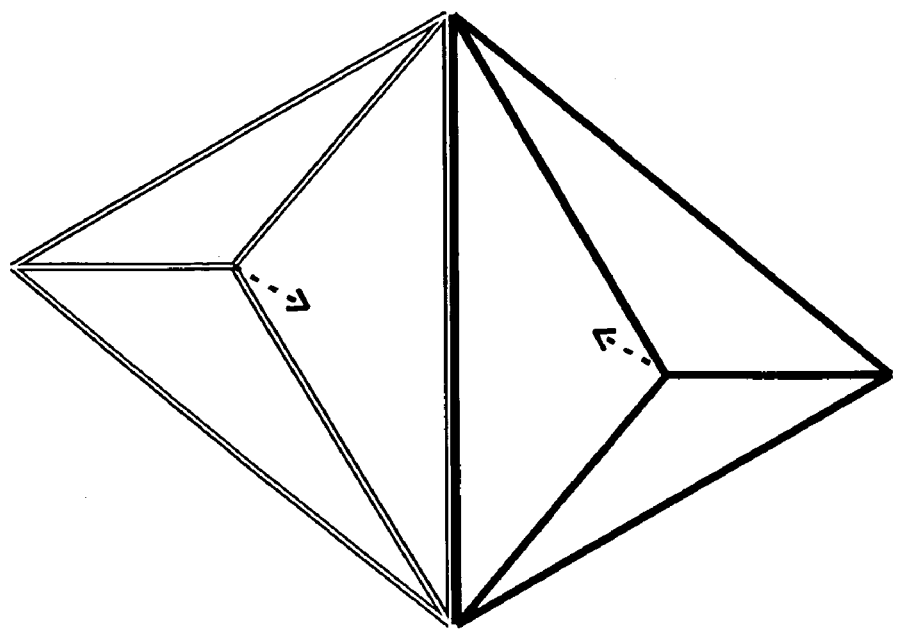
FIG. 14 is a plan view of a pair of FIG. 13A prior art cube corners illustrating the skew relationship between the cube axes.
Figure 15:
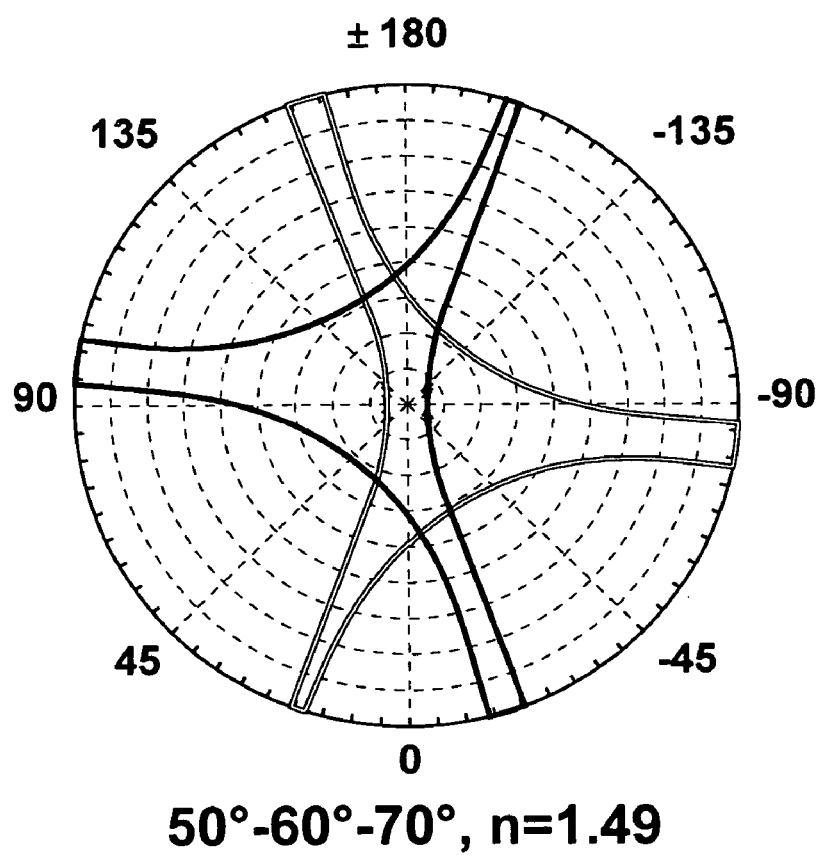
FIG. 15 is the Chandler diagram for the pair of cube corners illustrated in FIG. 14.
Figure 16:
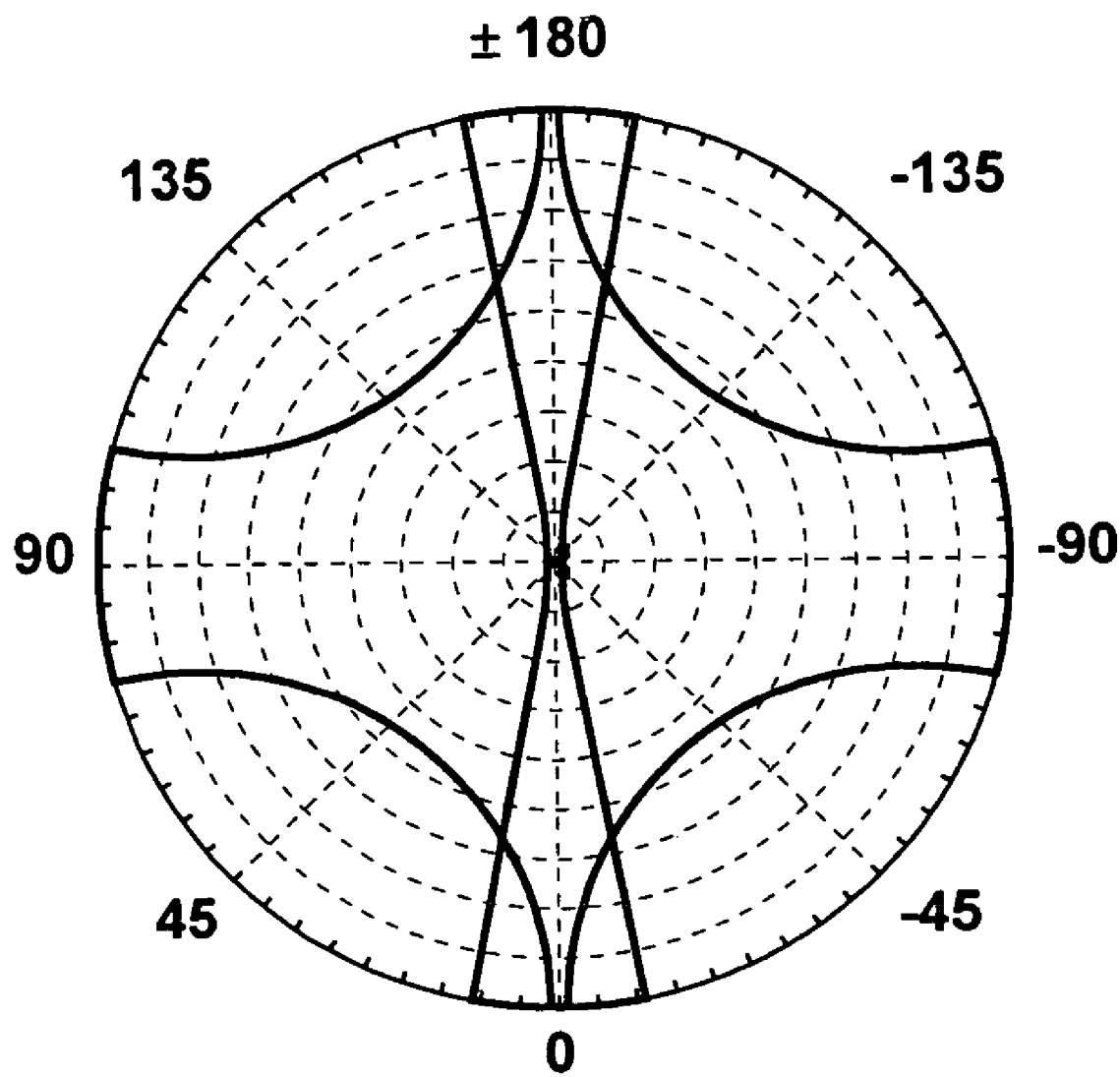
FIG. 16 is the Chandler diagram for 16° face-more-parallel prism cube corners of n=1.63 material.
Figure 17A:
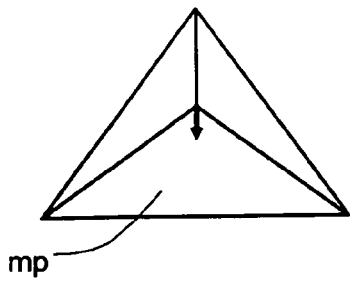
FIGS. 17A-17F illustrate the continuum of 11.3° cants from face-more-parallel, through compound, to edge-more-parallel, and the continuum of Chandler diagrams for the corresponding acrylic prisms.
Figure 17A:
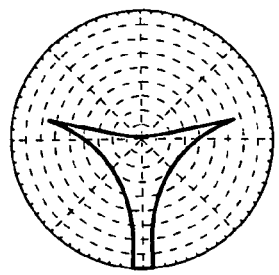
Figure 17B:
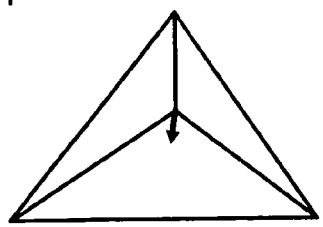
Figure 17B:
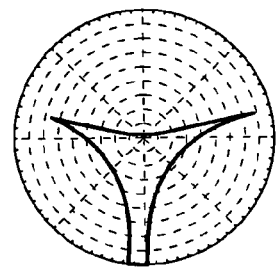
Figure 17C:
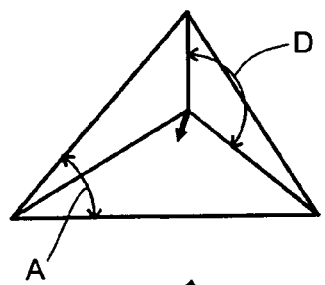
Figure 17C:
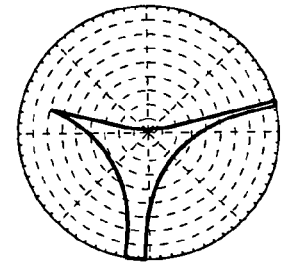
Figure 17D:
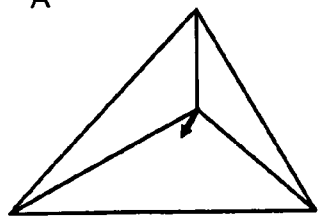
Figure 17D:
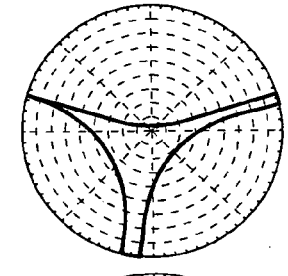
Figure 17E:
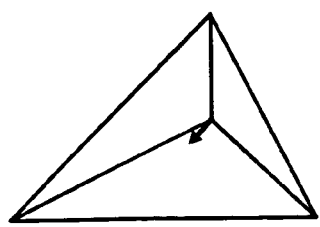
Figure 17E:
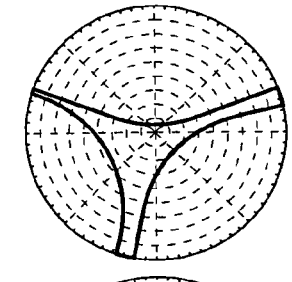
Figure 17F:
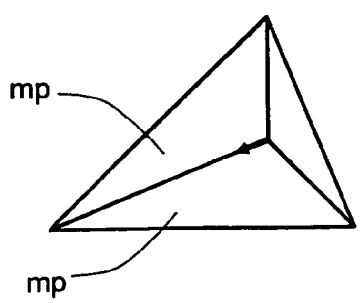
Figure 17F:
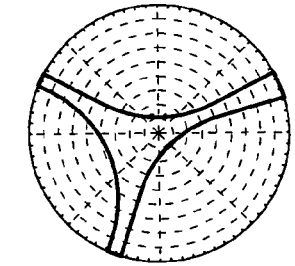
Figure 18A:
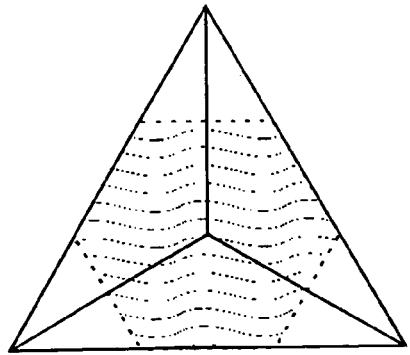
FIGS. 18A-18D illustrate how the effective aperture of prior art ruled triangular cube corners at normal incidence vary with the cant.
Figure 18B:
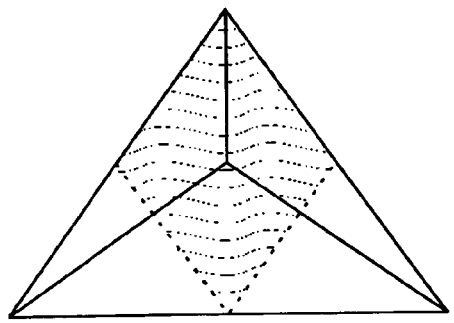
Figure 18C:
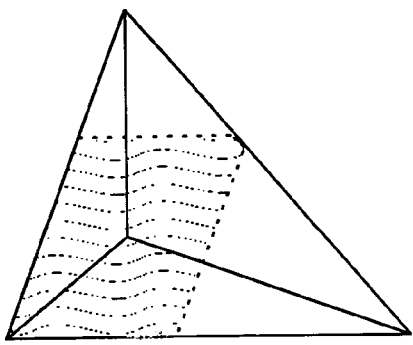
Figure 18D:
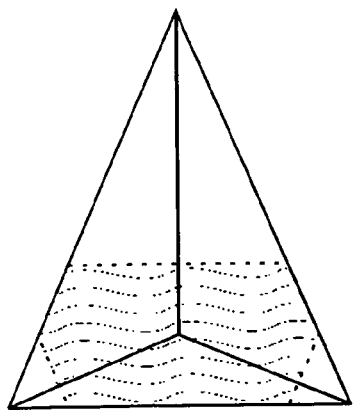
Figure 19A:
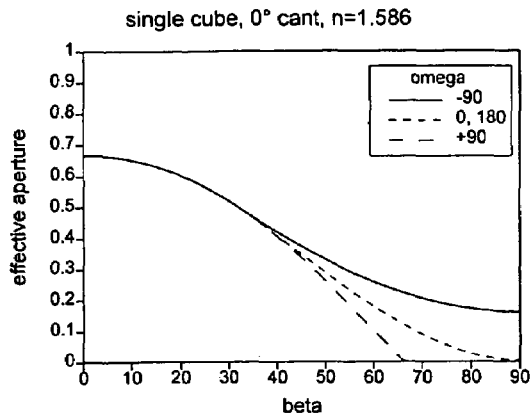
FIGS. 19A-19E illustrate how effective aperture varies as a function of entrance angle β at selected ω's for prior art ruled triangular polycarbonate cube corners without cant and canted 9.74° face-more-parallel, 50-60-70 compound, and 9.74° edge-more-parallel.
Figure 19B:
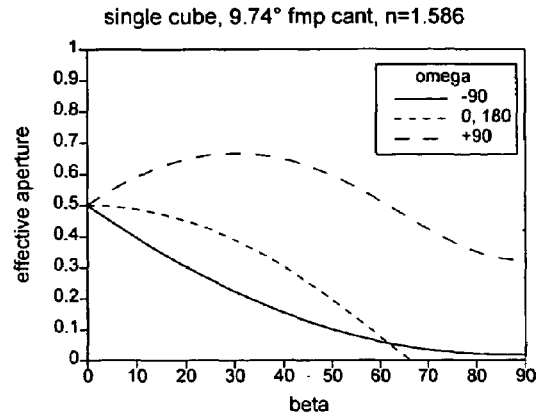
Figure 19C:
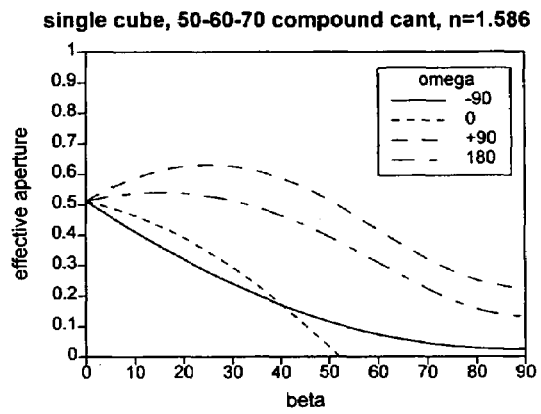
Figure 19D:
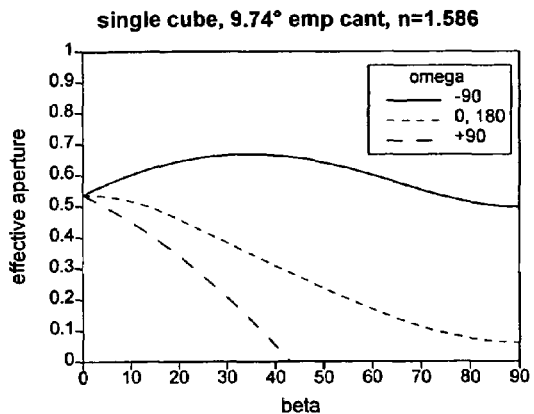
Figure 19E:
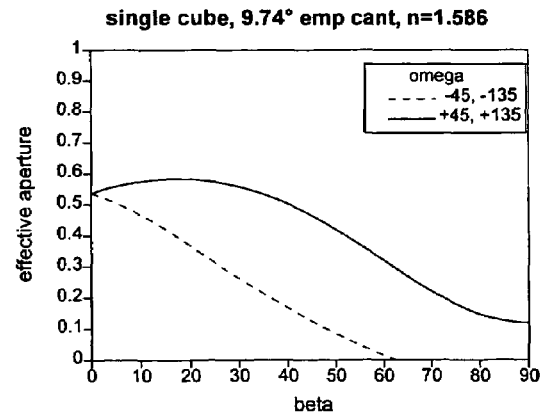
Figure 20A:
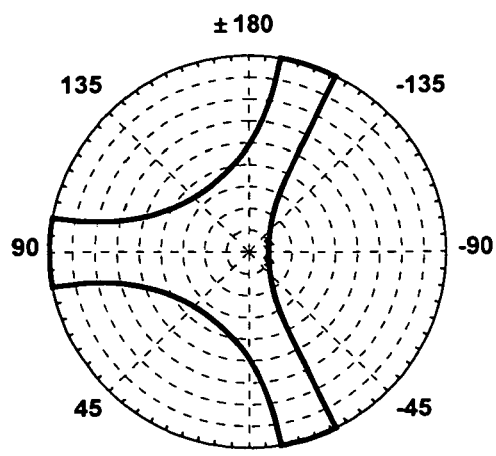
FIGS. 20A, 20B, and 20C are the Chandler diagrams for the 9.74° canted cube corners of FIGS. 19B, 19C, and 19D&E, respectively.
Figure 20A:
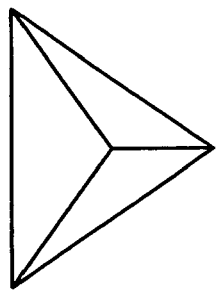
Figure 20B:
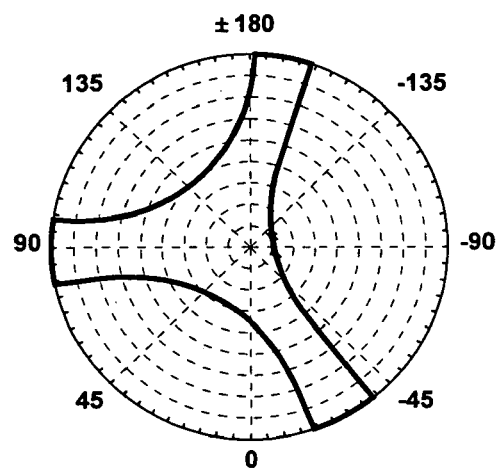
Figure 20B:
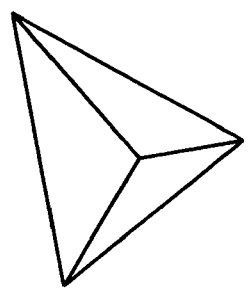
Figure 20C:
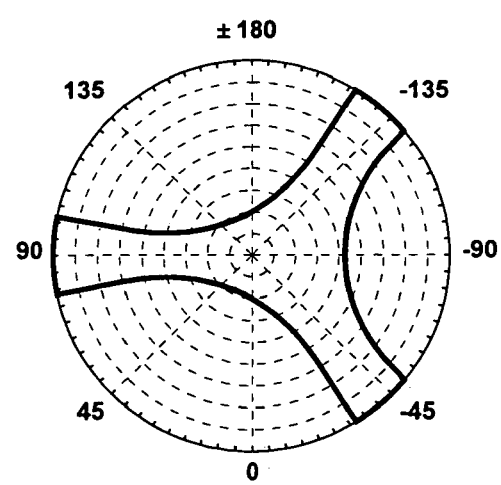
Figure 20C:
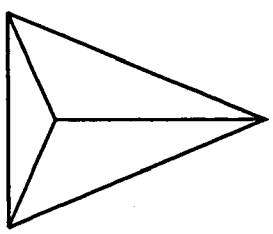
Figure 21:
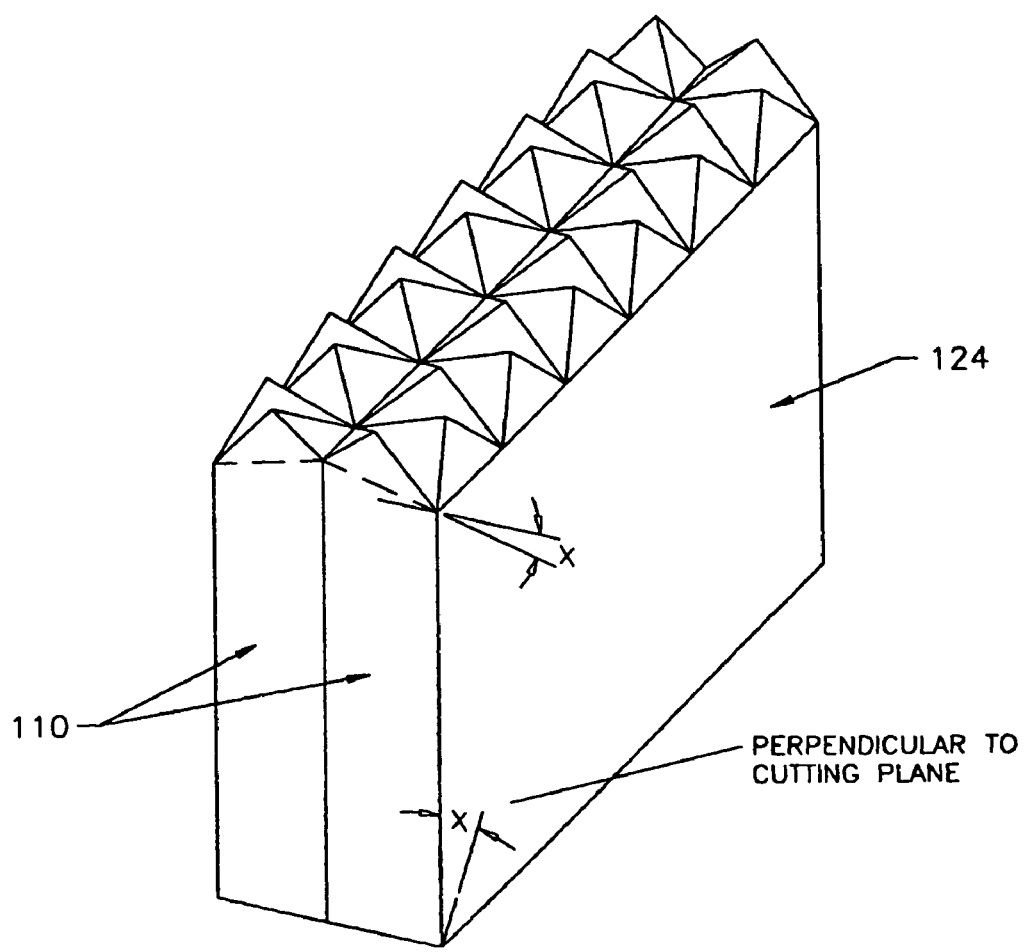
FIG. 21 is a perspective view of a prior art male tool comprising non rulable triangular cube corners.
Figure 22:
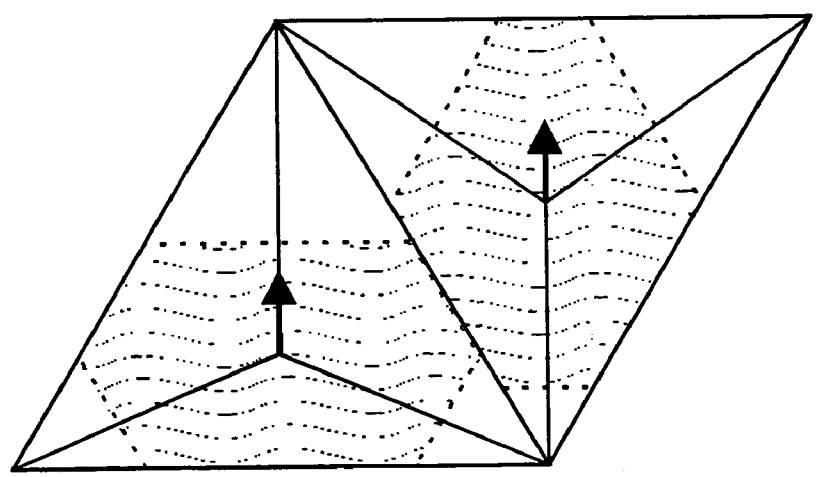
FIG. 22 illustrates the effective apertures of two cube corners from FIG. 21.

The Chandler diagram for the cube corner prism of FIG. 30A is given, with suitable rotation, in FIG. 13B if the prism is made of acrylic or, with suitable rotation, in FIG. 20B if the prism is made of polycarbonate. The rotations are necessary because in FIG. 30A, the longest side of the triangle is 40° counterclockwise of vertical, while in FIG. 13A it is vertical and in FIG. 20B it is 10° counterclockwise of vertical. The Chandler diagram is independent of apex displacement.

Effective aperture depends on apex displacement. FIGS. 31A-E show how the geometric efficiency of 50°-60°-70° triangular and quasi-triangular cube corner prisms made of polycarbonate depend on the apex displacement parameter ρ. The geometric efficiency is calculated for a ruled array including two prism orientations 180° apart. The triangles are oriented as shown in FIG. 20B, or rotated 180°. The triangles all have their longest side 10° counter-clockwise of vertical. In each of FIGS. 31A-E the radial direction represents entrance angle β from 0° to 60°, while the circumferential direction represents orientation angle ω. Thus FIGS. 31A-E have the same format as Chandler diagrams except for the limitation in entrance angle.

Figure 1:
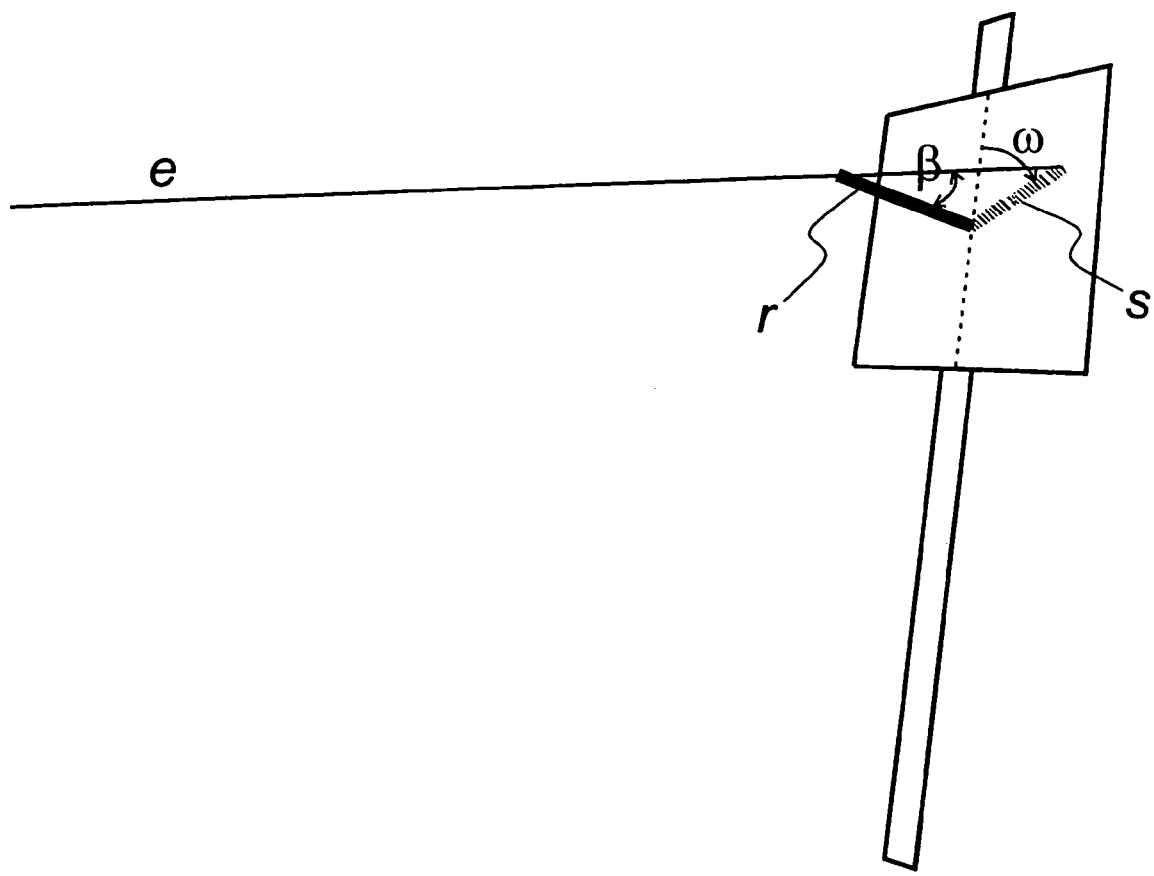
FIG. 1 is a perspective view of a road sign having an imaginary rod projecting from its center to illustrate the entrance angle β and orientation angle ω.
Figure 2A:
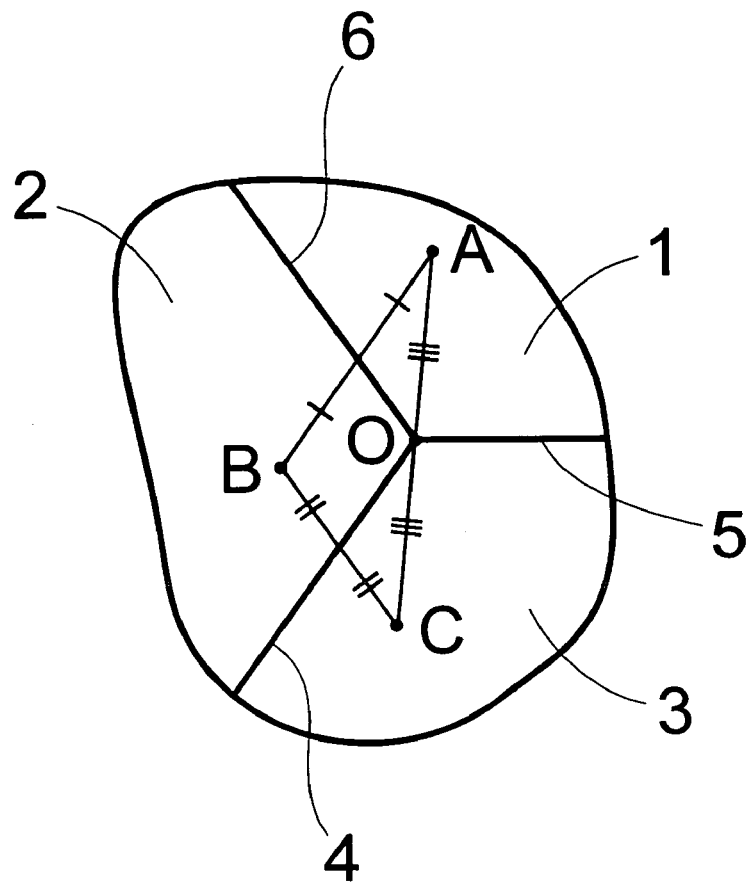
FIG. 2A is a view of a cube corner in the direction of entering light illustrating how the exit point C is determined from the arrival point A.
Figure 2B:
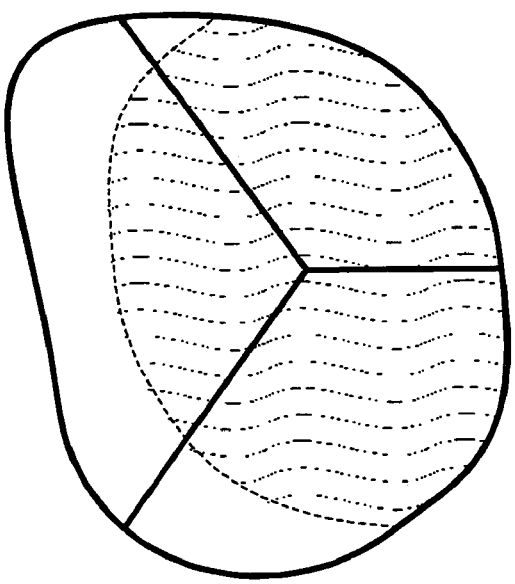
FIG. 2B illustrates the area of the cube corner of FIG. 2A that is optically effective for retroreflection.
Figure 2C:
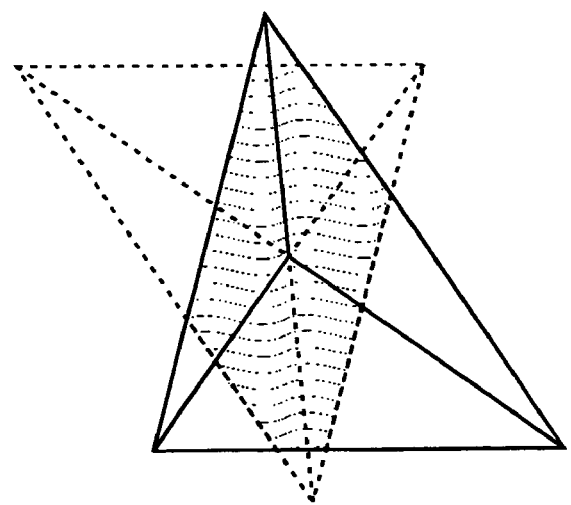
FIG. 2C illustrates how the effective aperture of a triangular cube corner can be found as the intersection of the cube corner triangle rotated 180° about the apex point.
Figure 3:
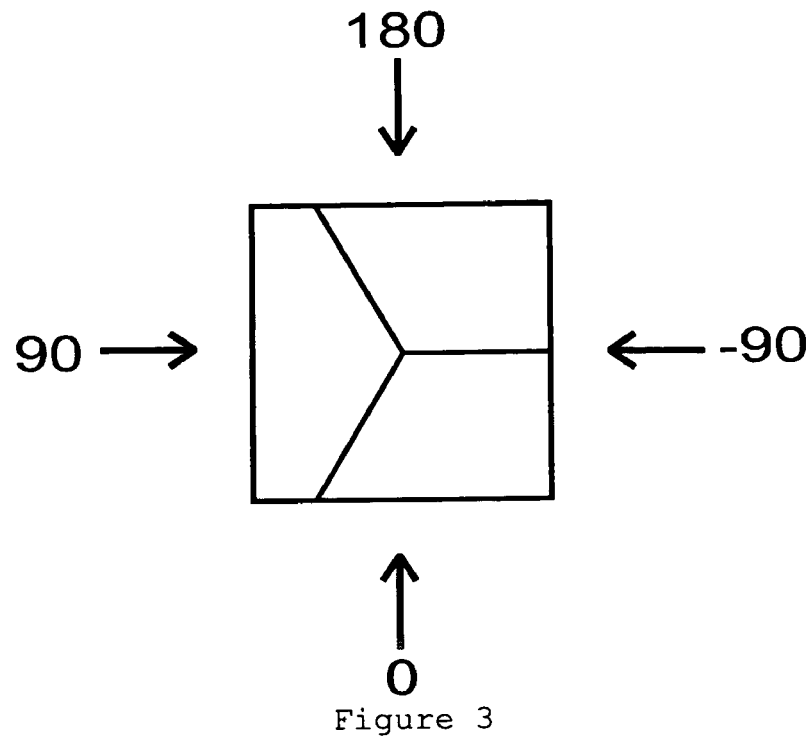
FIG. 3 is a plan view of a prior art uncanted cube corner, illustrating the different omega directions from which an incident beam of light can enter.
Figure 4:
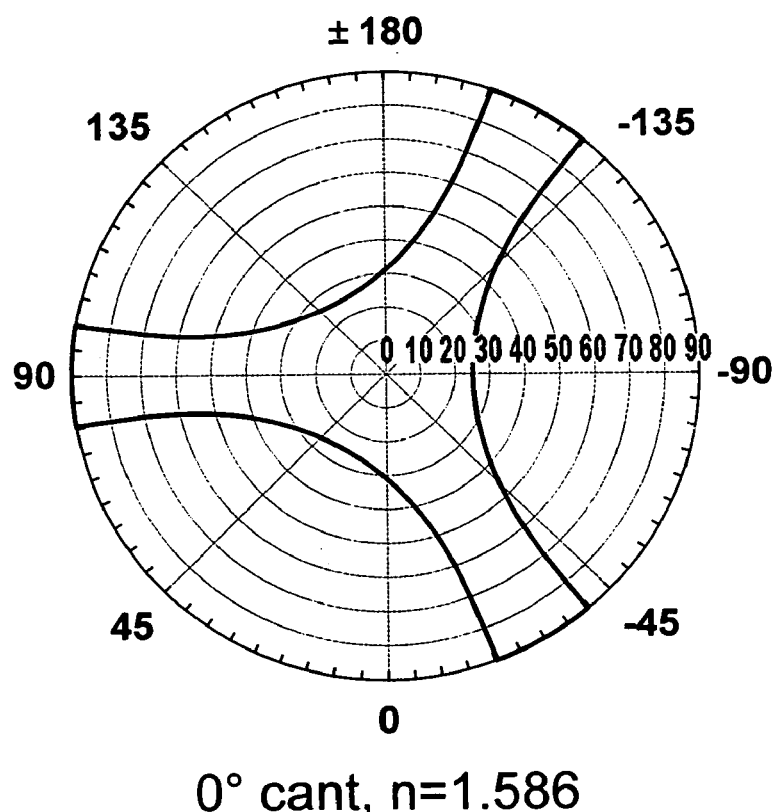
FIG. 4 is a Chandler diagram for the prior art cube corner of FIG. 3.
Figure 5:
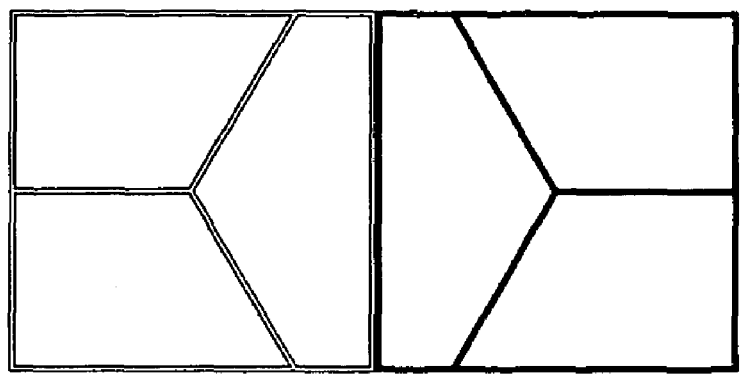
FIG. 5 illustrates how uncanted cube corners have been "paired" in the prior art in order to provide large entrance angle TIR over a range of orientation angles ω that includes −9020 and +90°.
Figure 6:
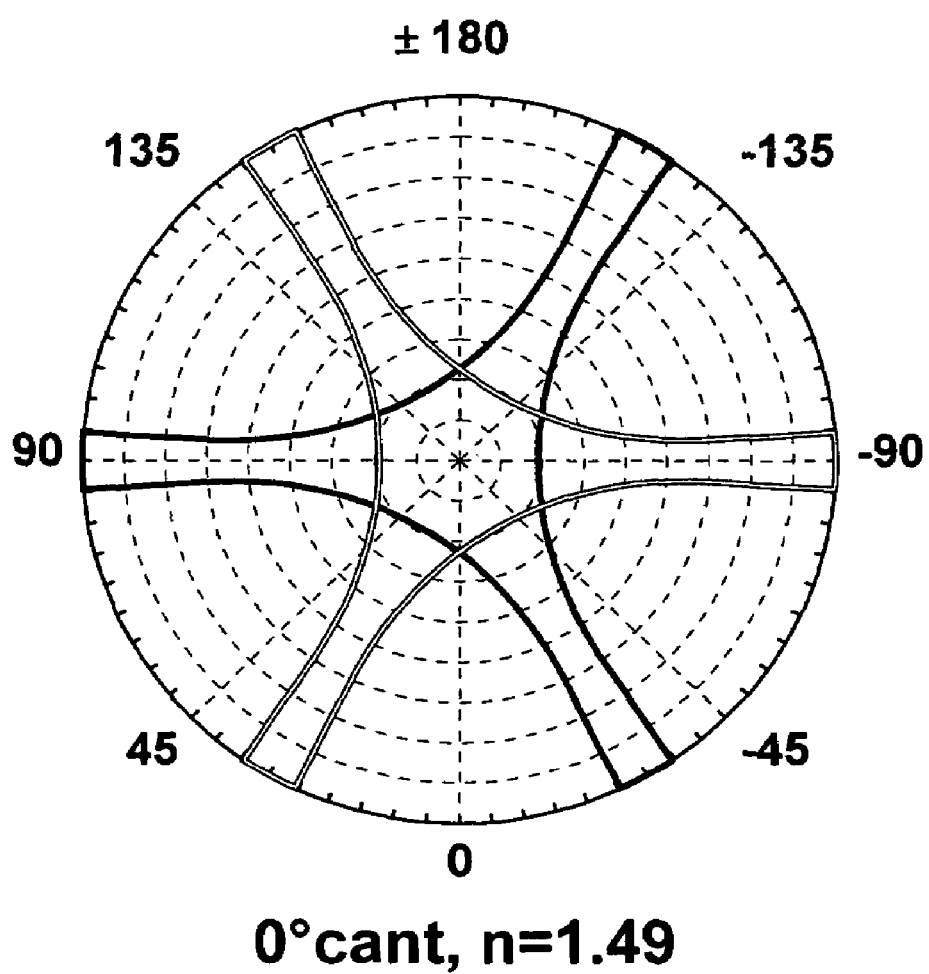
FIG. 6 illustrates the superimposed Chandler diagrams for the two cube corners of FIG. 5, as acrylic prisms.
Figure 7:
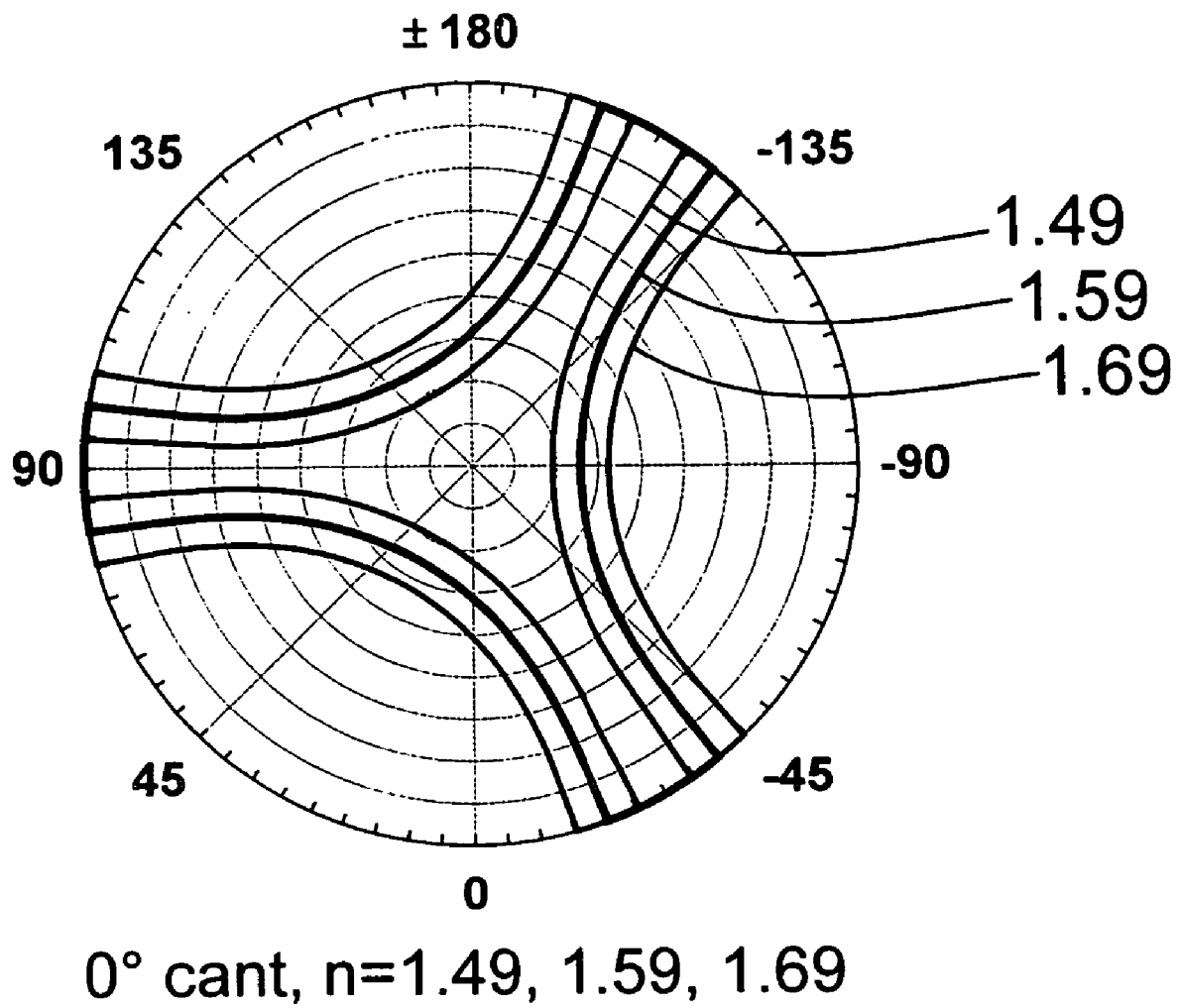
FIG. 7 illustrates how the Chandler diagram for an uncanted prismatic cube corner changes as a function of the index of refraction of its material.
Figure 8:
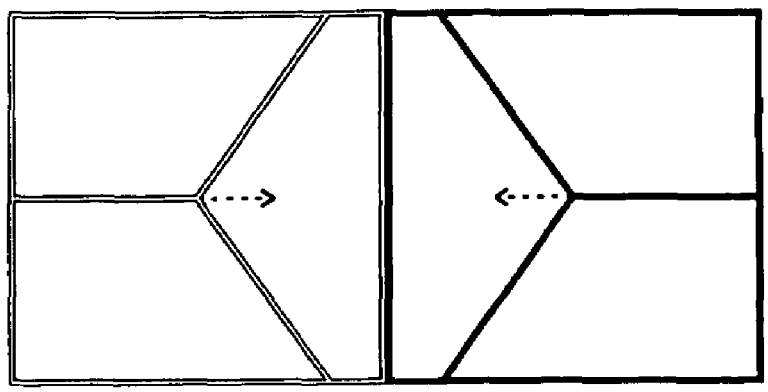
FIG. 8 is a plan view of a pair of prior art 10° face-more-parallel canted cube corners.
Figure 9:
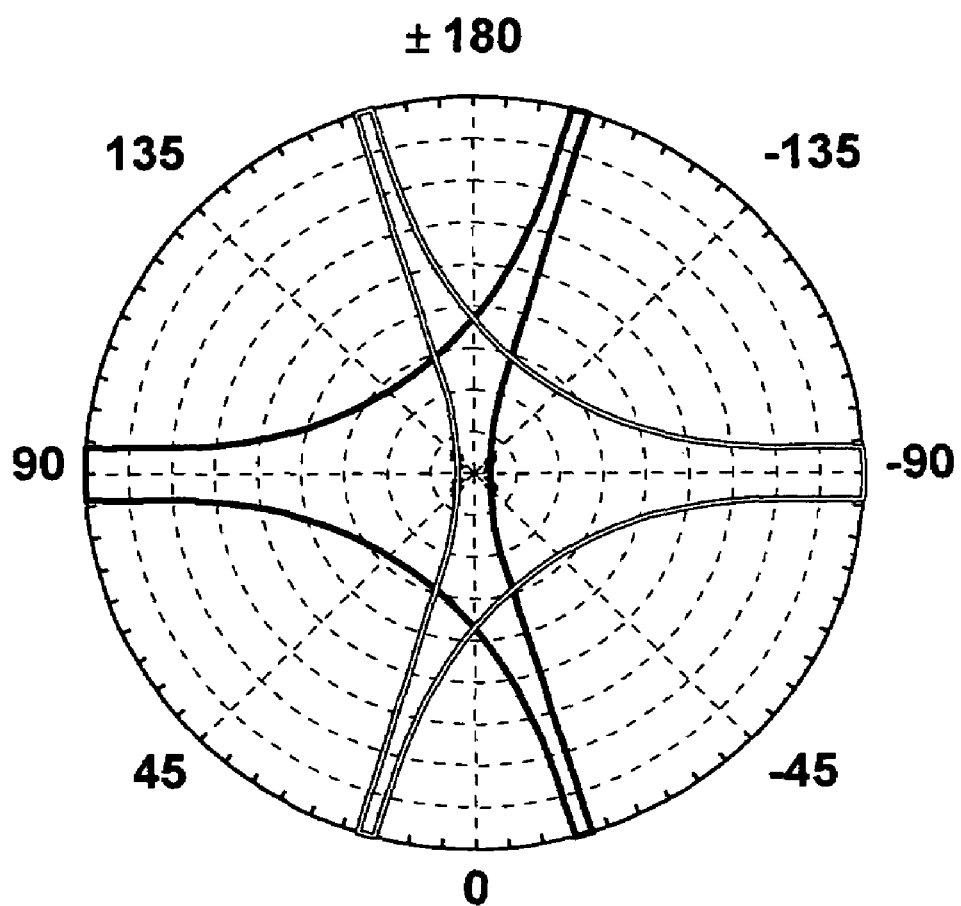
FIG. 9 is a Chandler diagram for the cube corners illustrated in FIG. 8, as acrylic prisms.
Figure 10:
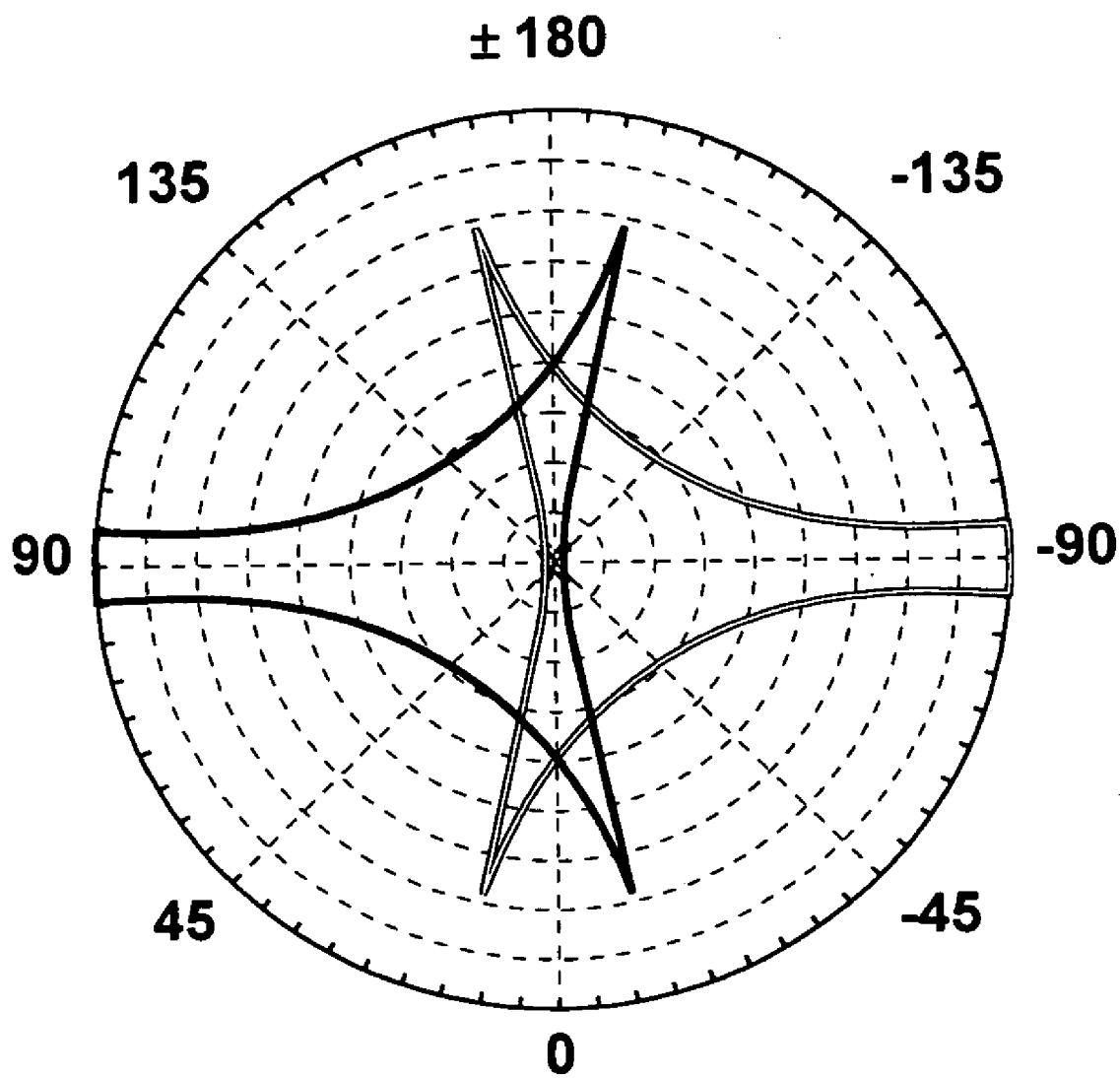
FIG. 10 is a Chandler diagram for a pair of prior art cube corners such as those illustrated in FIG. 8 but with 11.3° face-more-parallel cant, as acrylic prisms.
Figure 11:
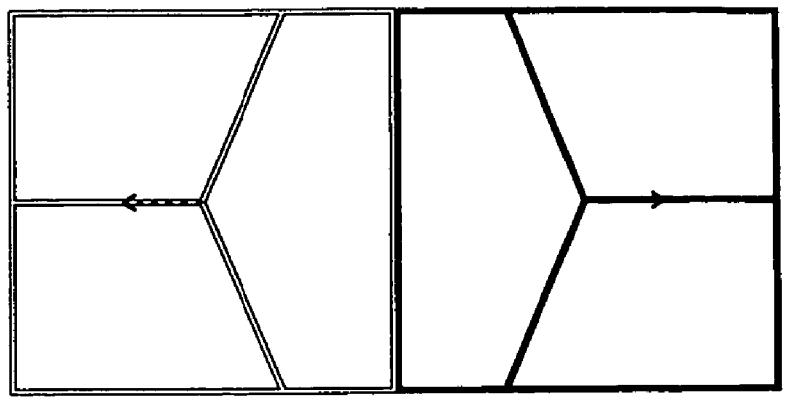
FIG. 11 is a plan view of a pair of prior art 10° edge-more-parallel cube corners.
Figure 12:
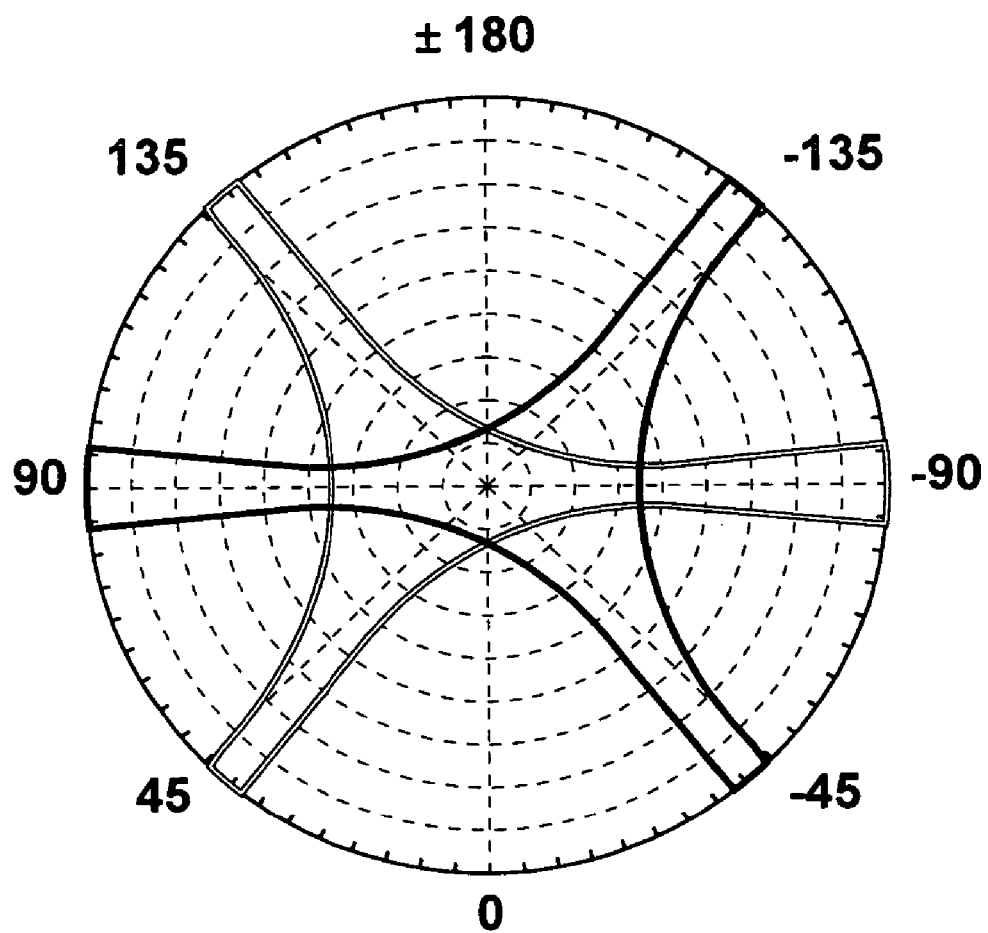
FIG. 12 is a Chandler diagram for the cube corners illustrated in FIG. 11, as acrylic prisms.

Geometric efficiency is the product of the effective aperture and combined face reflectance. Combined face reflectance is slightly more informative than the Chandler diagram, because the latter only shows when the combined face reflectance is 100%. Geometric efficiency may conveniently be determined by ray tracing methods which incorporate Fresnel reflection at surfaces. It may also be determined by separately calculating the effective aperture by the method of FIG. 2A and the combined face reflectance by applying the Fresnel equations to all three internal reflections. The latter calculation is made simpler by the recognition that the incidence angle which an illumination ray makes on a any face in a cube corner, whether met first, second, or third, is equal to the incidence angle which a ray parallel to the incoming ray and meeting that face first, makes at that face. Polarization is ignored in the determination of geometric efficiency.

The five FIGS. 31A, 31B, 31C, 31D, 31E are for $\rho=0$, 0.25, 0.5, 0.75, 1, respectively. The first three figures show the progressive improvement in geometric efficiency from $\rho=0$ of the prior art to $\rho=0.25$ and then to $\rho=0.5$. The next FIG. suggests slight additional improvement with $\rho=0.75$. The last figure shows decline with $\rho=1$. That is, $\rho=1$ is insignificantly better than $\rho=0.75$ at small $\beta$, but significantly worse at large $\beta$.

FIGS. 31A-E illustrate the importance of the rotation of the prismatic elements for achieving good entrance angularity for all four omegas: $-90°$; $0°$; $90°$; $180°$. The $10°$ counter-clockwise rotation used for these examples represents a compromise in which geometric efficiency at very large entrance angles for omega=$\pm 90°$ is obtained at the expense of geometric efficiency at somewhat smaller entrance angles at omega=$0°$ and $180°$. Other rotations between about $20°$ counter-clockwise and about $20°$ clockwise could well be chosen to effect other compromises.

Figure 32A:
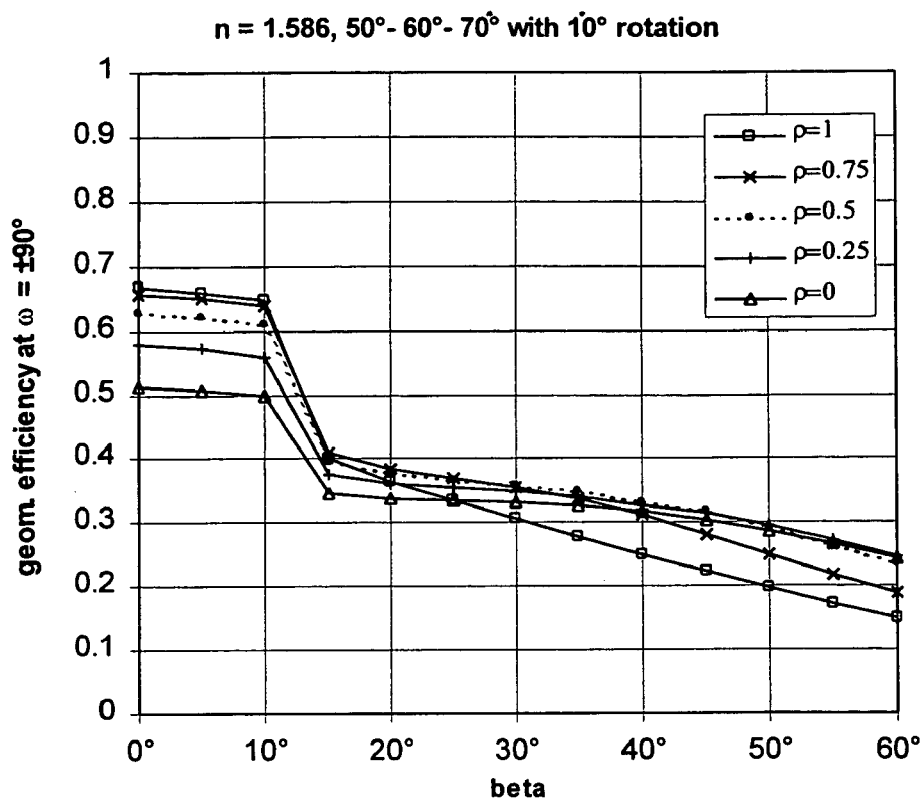
FIGS. 32A and 32B are graphs derived from FIGS. 31A-31E, FIG. 32A detailing the geometric efficiency for the two ω's −90° and +90°, and FIG. 32B for the two ω's 0° and 180°.
Figure 32B:
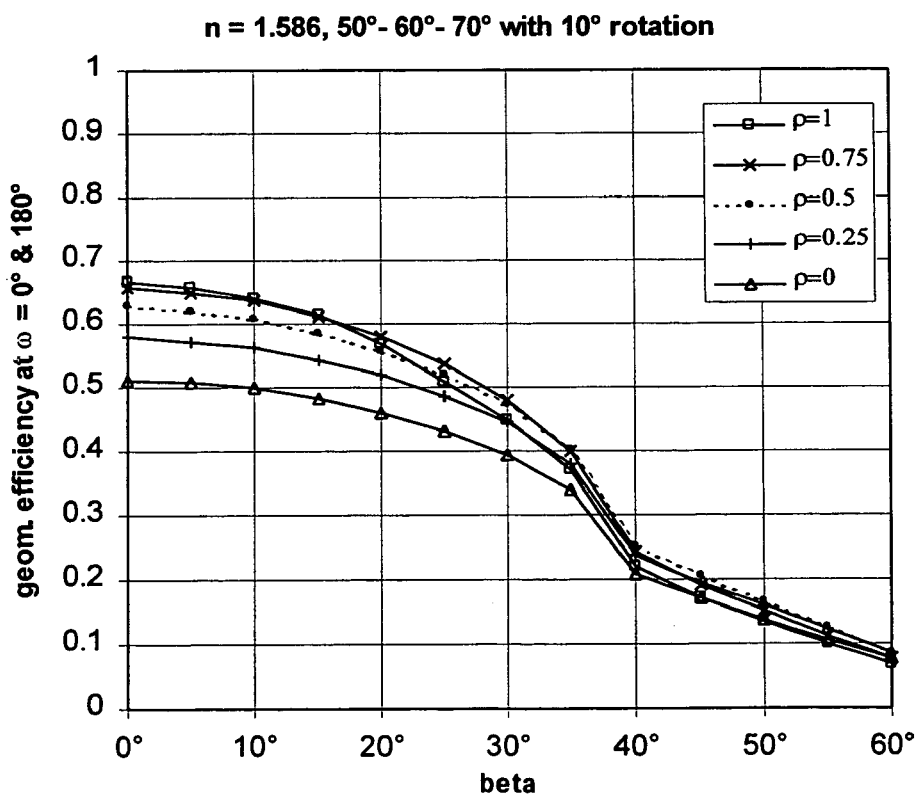

FIGS. 32A-B show some of the data of FIGS. 31A-E for quantitative comparison. FIG. 32A shows the geometric efficiencies on horizontal slices of FIGS. 31A-E, corresponding to omega $-90°$ or $+90°$. FIG. 32B shows the geometric efficiency on vertical slices of FIGS. 31A-E corresponding to omega $0°$ or $180°$. The great improvement over $\rho=0$ cube corners of prior art is evident. The advantage of $\rho=0.75$ over $\rho=1$ is also evident. $\rho=0.5$ is generally advantageous over $\rho=0.25$. $\rho=0.75$ and $\rho=0.5$ are the most virtuous of the five apex displacements considered. The choice between $\rho=0.75$ and $\rho=0.5$ depends on the relative importance of small and large entrance angles, respectively.

Figure 30B:
FIG. 30B illustrates the eight apex locations for a ruling in which the grooves alternate between ρ=0.5 depths and ρ=0.75 depths.
Figure 31A:
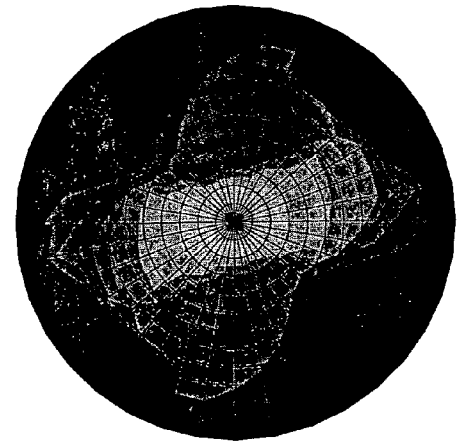
FIGS. 31A-31E are polar graphs of geometric efficiency over all ω with β between 0° and 60°, for cube corner arrays of the invention, illustrating the improvement from ρ=0 through ρ=0.75.
Figure 31B:
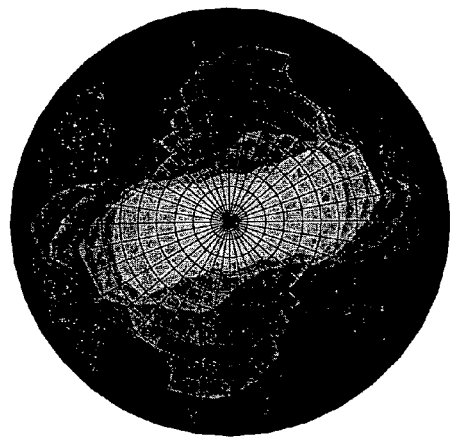
Figure 31C:
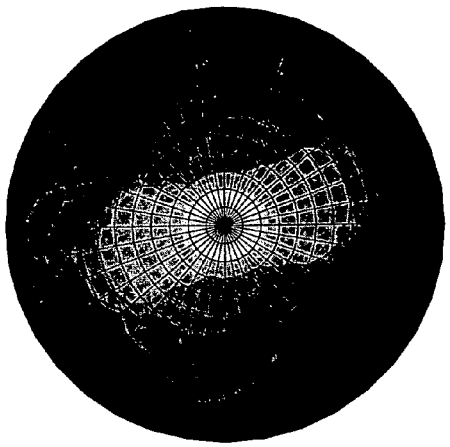
Figure 31D:
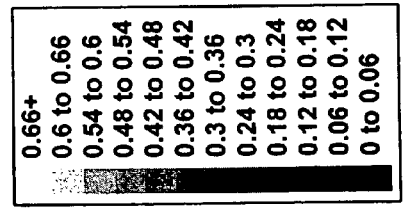
Figure 31D:
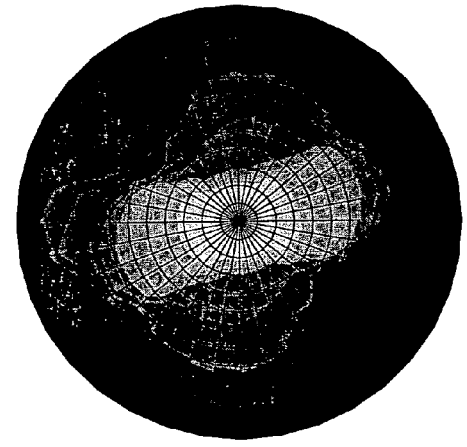
Figure 31E:
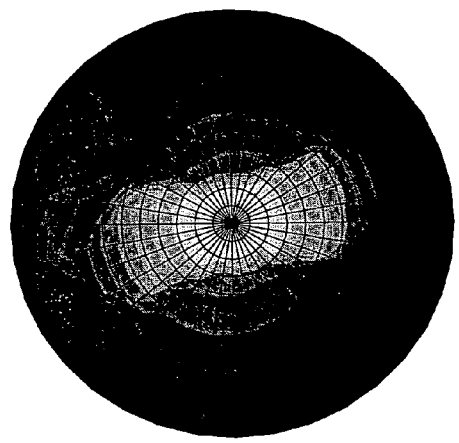

Since performance is virtuous over a range of apex displacements $\rho$, and since small distance of the apex from the HG line on which $\rho$ is defined is harmless, it is possible to apply the invention in such a way that the groove depths within each groove set are not held constant. For example, the groove depths in each set could alternate between the depth that would produce $\rho=0.75$ and the depth that would produce $\rho=0.5$. In this example, one-eighth of the cube corners are $\rho=0.75$ versions and one-eighth are $\rho=0.5$ versions. The remaining three-fourths consists of six hybrid types with their apices not on the HG line. FIG. 30B shows an enlargement of the HG line from FIG. 30A including the $\rho=0.75$ point X. Point Y in FIG. 30B is the $\rho=0.5$ point. The six smaller points show the other apex locations for the example ruling having alternating depths in each groove set.

Figure 33:
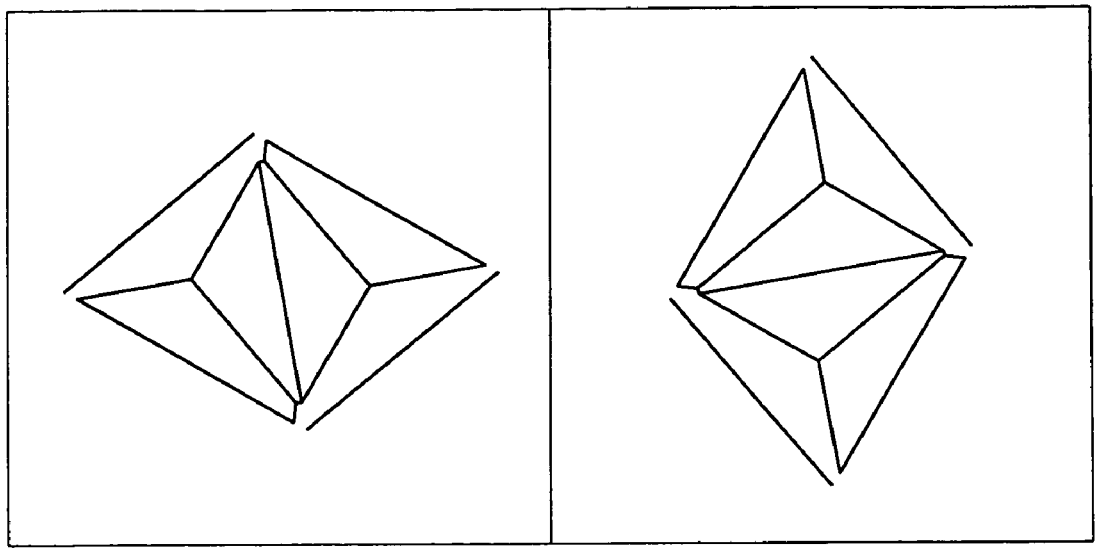
FIG. 33 shows schematically a two pin assembly using 50°-60°-70° ρ=0.5 cube corners of the invention.
Figure 34:
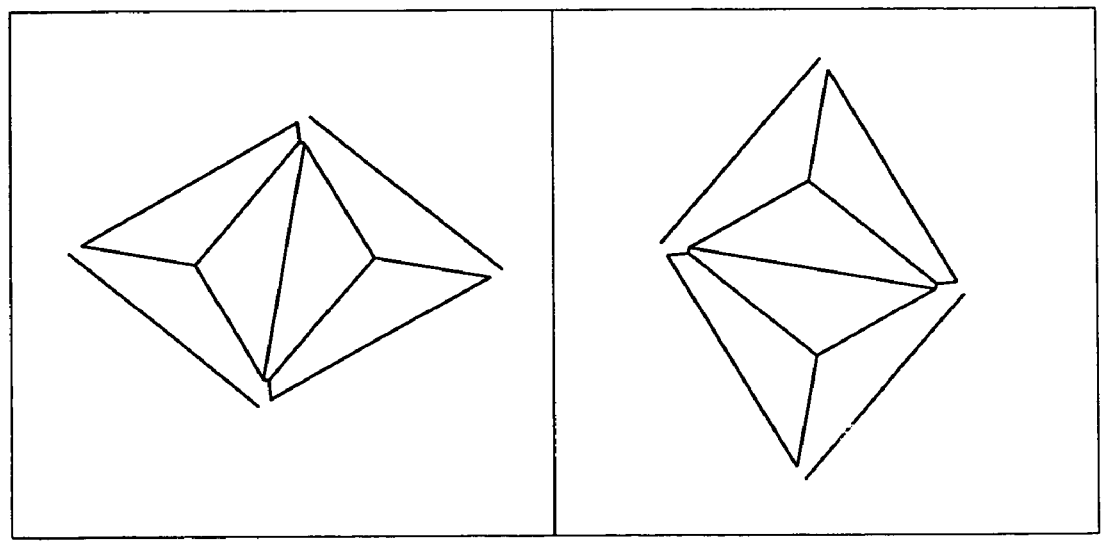
FIG. 34 shows schematically a two pin assembly using mirror images of the cube corners shown in FIG. 33.
Figure 35:
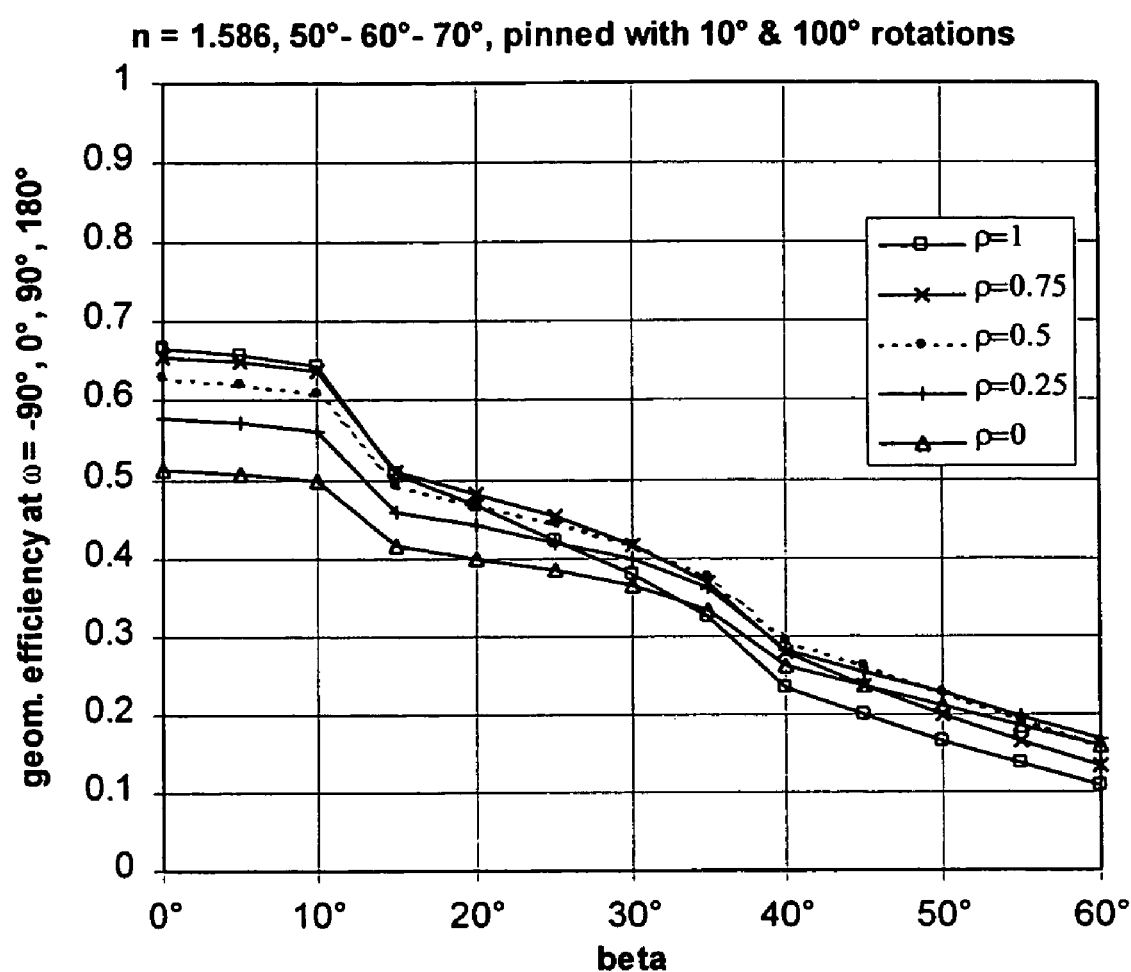
FIG. 35 graphs the geometric efficiency, as polycarbonate prisms, of pinned cube corner designs of the invention, like those of FIGS. 33 and 34, for the range of ρ's from 0 to 1.
Figure 36B:
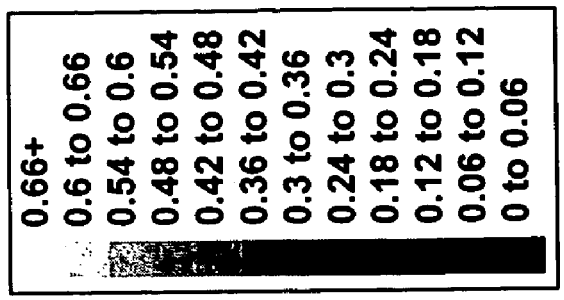
FIG. 36B is a polar graph illustrating the geometric efficiency, as polycarbonate prisms, of the four-pin structure that combines FIGS. 33 and 34.
Figure 36B:
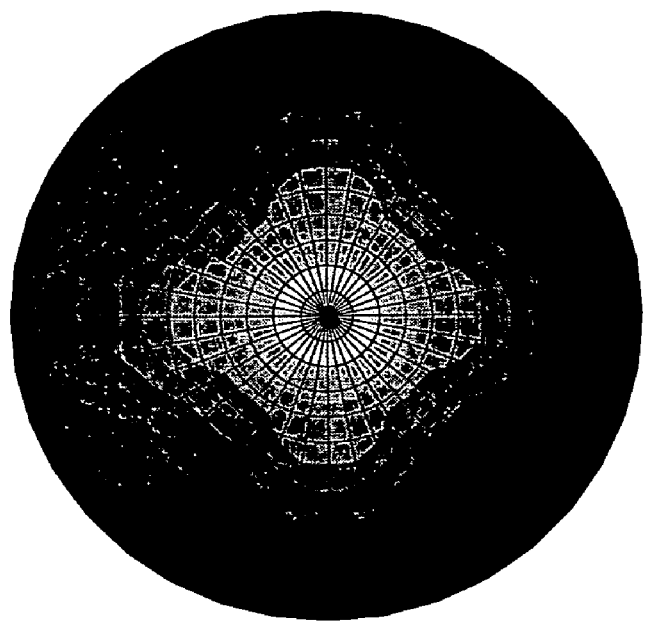
Figure 36A:
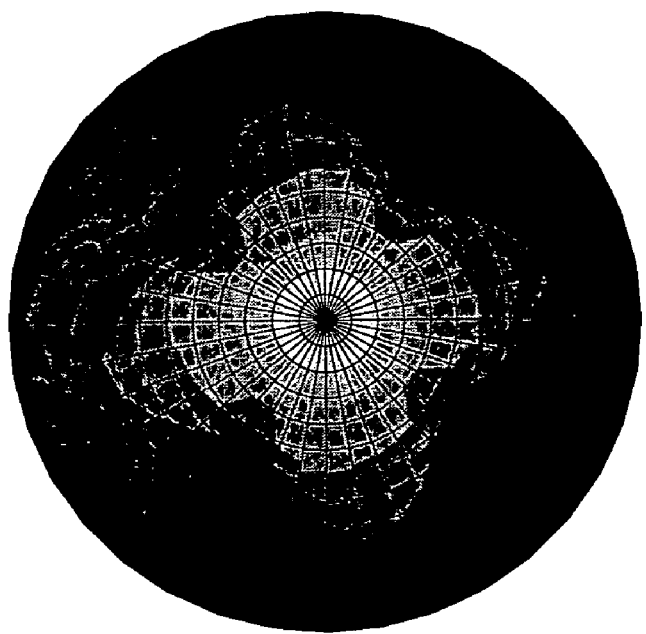
FIG. 36A is a polar graph illustrating the geometric efficiency, as polycarbonate prisms, of the two-pin structures of FIGS. 33 or 34.

While the cube corner designs characterized in FIGS. 31B-D and 32A-B have good entrance angularity for all four omegas: $-90°$; $0°$; $90°$; $180°$; the directions are not equivalent. No cube corner prism together with its $180°$ rotated mate can achieve that. For applications where equal performance is required in all four directions the old trick of "pinning", lately termed "tiling", may be employed. The mechanics of pinning was disclosed in Montalbano U.S. Pat. No. 4,460,449, and pinning was used in the Stimsonite "High Performance Grade" prismatic sheeting first marketed in 1986. Large thick ruled masters bearing identical cube corner arrays were diced into square pins, which were reassembled, with rotations of the cube corner array, into a new large thick master. The result was cube corner prisms having more than two rotations in the final array. FIG. 33 shows schematically a two-pin assembly utilizing the $50°$-$60°$-$70°$ $\rho=0.5$ cube corner prisms of the present invention. The left pin in FIG. 33 has the direction of its bluntest groove $10°$ counter-clockwise of vertical, the same rotation used for FIGS. 31A-E. The right pin in FIG. 33 has the same cube corners rotated by $90°$ clockwise, or equivalently counter-clockwise. The geometric efficiency of this $10°$ and $100°$ pinned assembly is an average of the geometric efficiencies of the separate pins. FIG. 35 shows the geometric efficiency in all four main omega directions for this pinned structure for each of $\rho=0$ (prior art), 0.25, 0.5, 0.75, and 1. FIG. 35 is exactly the averaging of FIGS. 32A and 32B. FIG. 35 shows again that the $\rho=0$ (prior art) and $\rho=1$ designs are the least effective. The $\rho=0.25$ design is somewhat inferior to the $\rho=0.5$. The choice between $\rho=0.5$ and $\rho=0.75$ depends on application. FIG. 36A shows the geometric efficiency of the $\rho=0.5$ design in this pinned structure. FIG. 36A is to be compared with FIG. 31C which used the same prisms without pinning. FIG. 36A has $90°$ rotational symmetry, but it still lacks left-right symmetry. FIG. 34 shows schematically two pins with $70°$-$60°$-$50°$ cube corners which are mirror images of the $50°$-$60°$-$70°$ cube corner pins shown schematically in FIG. 33. The geometric efficiency of the FIG. 34 structure will be the mirror image of FIG. 36A. Assembling all four pins from FIGS. 33 and 34 into a single sheeting structure results in the geometric efficiency shown in FIG. 36B which has both $90°$ rotational symmetry and left-right symmetry. The graphs of FIG. 35 apply to the four pin structure.

While it achieves symmetry, a pinned assembly also has disadvantages. Accurate pins with ruled ends are difficult to make and to assemble. There is inevitable loss of retroreflectance at pin edges where cubes are truncated or distorted. It is realistic to derate the efficiencies in FIGS. 35, 36A-B by $0.95\times$ for these reasons.

The table below gives ruling dimensions for $50°$-$60°$-$70°$ cube corners at $\rho=0.25, 0.5, 0.75,$ and $1$, with $\rho=0$ of the prior art included for reference. Since the depth of the structure increases with increasing rho, there is manufacturing advantage to smaller rho.

TABLE 1

| | 50°-60°-70° cube corners; triangle area = 1 | | | | | |
|---|---|---|---|---|---|---|
| | groove vee | groove spacing | groove depth below apex | | | |
| | | | $\rho = 0$ | $\rho = 0.25$ | $\rho = 0.5$ | $\rho = 0.75$ | $\rho = 1$ |
| $g_1$ | 54.57° | 1.458 | 0.594 | 0.681 | 0.768 | 0.855 | 0.942 |
| $g_2$ | 67.10° | 1.289 | 0.594 | 0.607 | 0.621 | 0.635 | 0.648 |
| $g_3$ | 88.22° | 1.188 | 0.594 | 0.548 | 0.501 | 0.455 | 0.409 |

The two bluntest grooves, $g_2$ and $g_3$, meet at the smallest angle of the triangle, $50°$. The two sharpest grooves, $g_1$ and $g_2$, meet at the largest angle of the triangle, $70°$.

A Preferred Embodiment

All the $50°$-$60°$-$70°$ cube corner prisms of polycarbonate have a sudden fall in geometric efficiency at about $\beta=11°$ for $\omega=\pm 90°$. This is caused by the loss in TIR in half the cube corners as shown in the Chandler diagram in FIG. 20B. The rather large $9.74°$ compound cant is responsible. Designs that have all cubes functioning to at least $\beta=15°$ for all $\omega$ are preferable for road sign applications. A $53°$-$60°$-$67°$ cube corner design having $6.70°$ compound cant is used in this preferred embodiment of the present invention. Table 2 gives ruling dimensions for $53°$-$60°$-$67°$ cube corners at $\rho=0.25, 0.5, 0.75,$ and $1$, with $\rho=0$ of the prior art included for reference.

TABLE 2

53°-60°-67° cube corners; triangle area = 1

| | groove vee | groove spacing | groove depth below apex | | | | |
|---|---|---|---|---|---|---|---|
| | | | ρ = 0 | ρ = 0.25 | ρ = 0.5 | ρ = 0.75 | ρ = 1 |
| $g_1$ | 59.35° | 1.413 | 0.608 | 0.662 | 0.717 | 0.772 | 0.827 |
| $g_2$ | 68.88° | 1.303 | 0.608 | 0.614 | 0.621 | 0.627 | 0.633 |
| $g_3$ | 82.54° | 1.226 | 0.608 | 0.572 | 0.537 | 0.501 | 0.466 |

For this embodiment, the cube apex is displaced by ρ=0.5. The prism material is polycarbonate with n=1.586. The cube corner array is rotated so the triangles' longest sides, corresponding to the cube corners bluntest, shallowest grooves, denoted $g_3$ in the TABLE 2, are 10° counter-clockwise from vertical.

Figure 37:
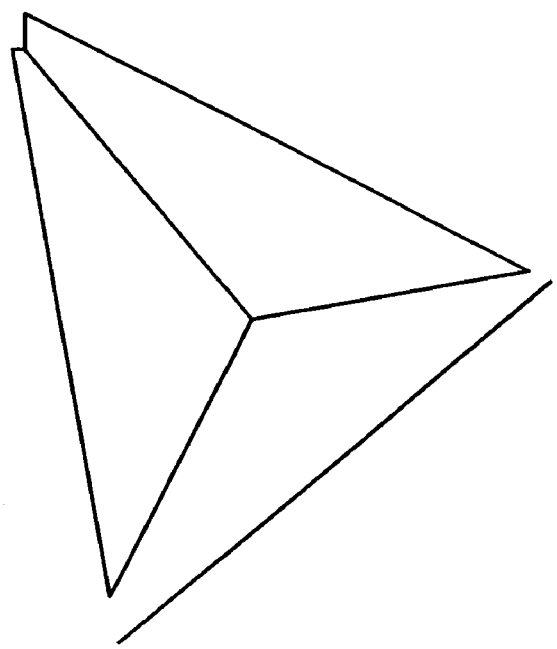
FIG. 37 is a plan view of a single quasi-triangular cube corner of the preferred embodiment.
Figure 38:
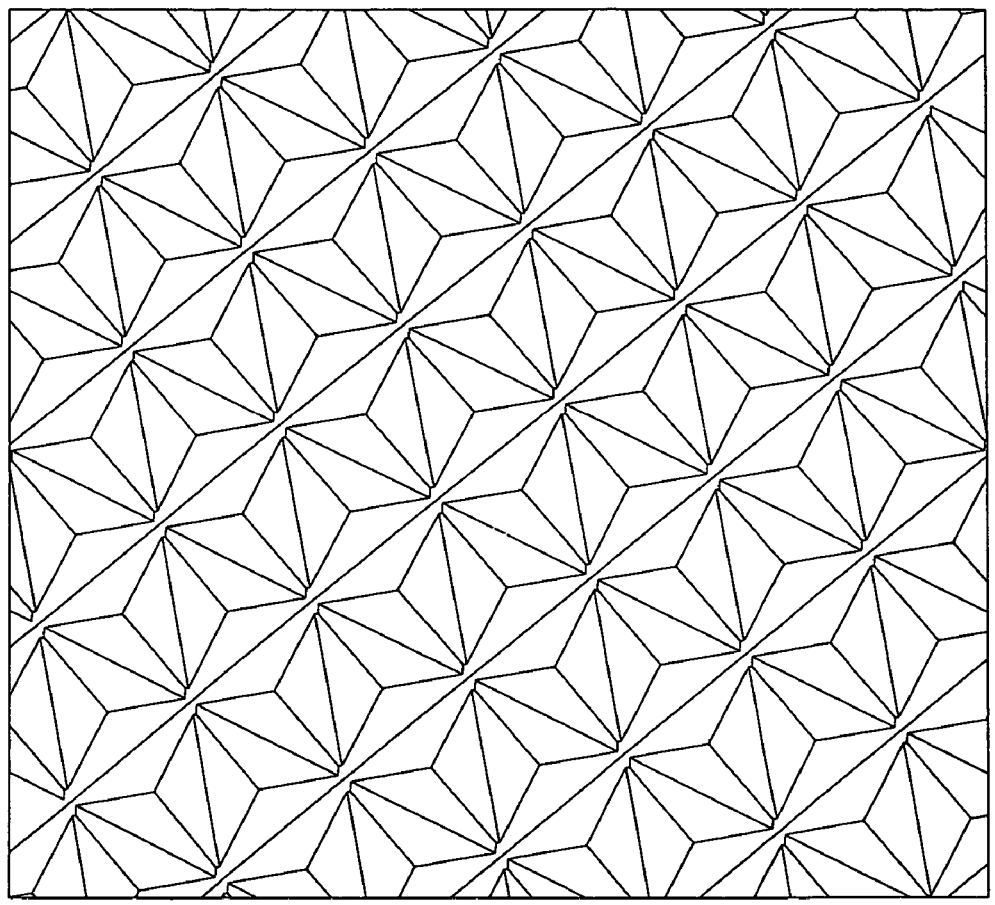
FIG. 38 is a plan view of a ruled array of the cube corners of FIG. 37.
Figure 39:
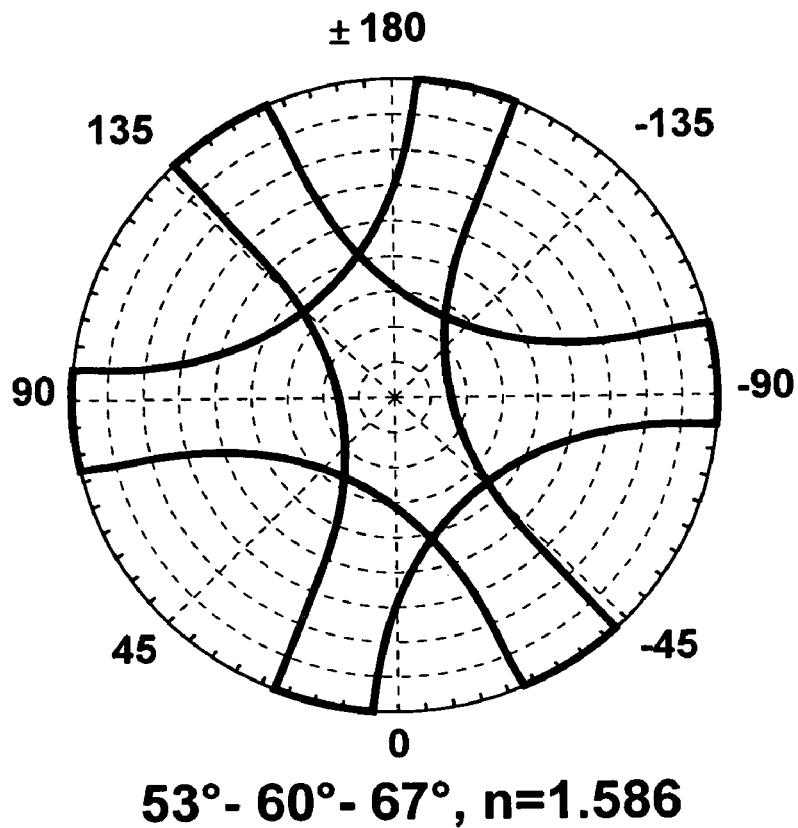
FIG. 39 is a Chandler diagram for the two rotations of the cube corner illustrated in FIG. 38.

FIG. 37 shows a single quasi-triangular cube corner of this preferred embodiment. FIG. 38 shows a portion of a ruled array of such cube corners. FIG. 39 shows the Chandler diagram for a pair of such cube corners.

The arms in the Chandler diagram for either cube corner in FIG. 39 make mutual angles of approximately 140.0°, 119.1°, 100.9°. For determining these angles we take the center point of the arm at β=50°. In the manufactured article the cube corners are rotated so that the arm which makes the two smaller angles is nearly aligned with the long sheet. This causes one of the other arms to arms to be approximately 10° away from the perpendicular direction, while the third arm is approximately 30° away from the perpendicular direction.

The Chandler diagram in FIG. 39 shows unlimited entrance angle in the ±90° directions and entrance angle limited to about 57° in the 0° and 180° direction. Conservatively, useful entrance angle is limited to 45° to 50° degrees in the latter direction.

Most road sign applications involve angle β in the range 0° to 15°, with angle ω unrestricted. Successful road sign sheeting needs to have all cubes functioning within this range. The Chandler diagram FIG. 39 shows TIR over the full 15° circle.

This TIR is sustained by 53°-60°-67° cube corners provided the refractive index is at least 1.580.

The ρ=0 prior art array ruled with the angles given above, and with grooves of equal depth, is comprised of triangular cube corners and has geometric efficiency 59.3% for normal incidence. The 59.3% value should be compared to the 66.7% geometric efficiency of equilateral, uncanted cube corners. In this preferred ρ=0.5 embodiment, the apex is displaced half way to the centroid. The displacement is accomplished by making quite unequal groove depths while leaving all groove angles, directions and spacings unchanged. From TABLE 2, the shallowest groove has 88% of the depth of the grooves of the corresponding prior art array, the intermediate groove has 102% of the prior art depth, and the deepest groove has 118% of the prior art depth.

The resulting array of trilevel quasi-triangular cube corners has geometric efficiency 64.8% at normal incidence, 1.09× as great as for the single depth triangle cube corners. The gain diminishes somewhat with increasing entrance angle, but parity isn't reached until between 50 and 55 degrees.

Figure 40:
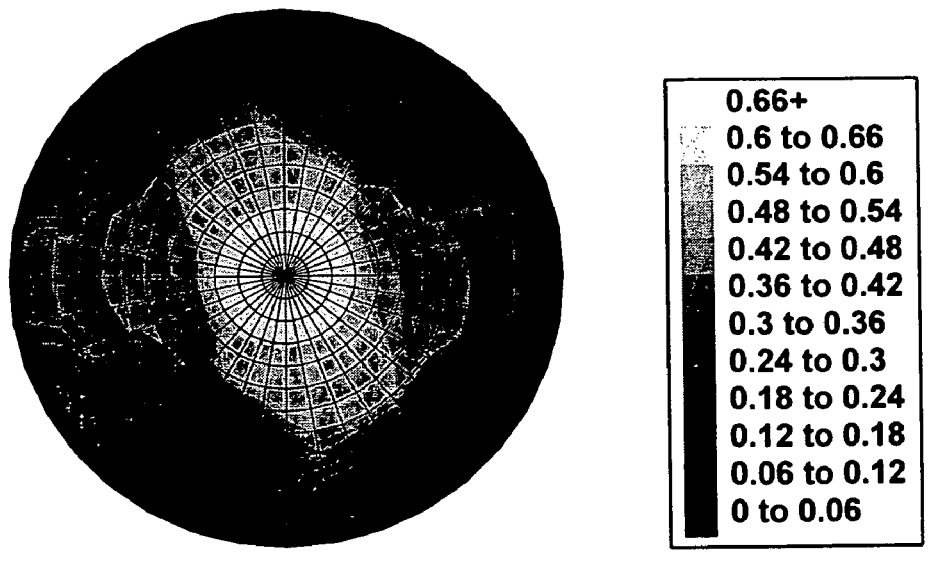
FIG. 40 is a polar graph of geometric efficiency over all ω with β between 0° and 60° for the preferred embodiment.
Figure 41A:
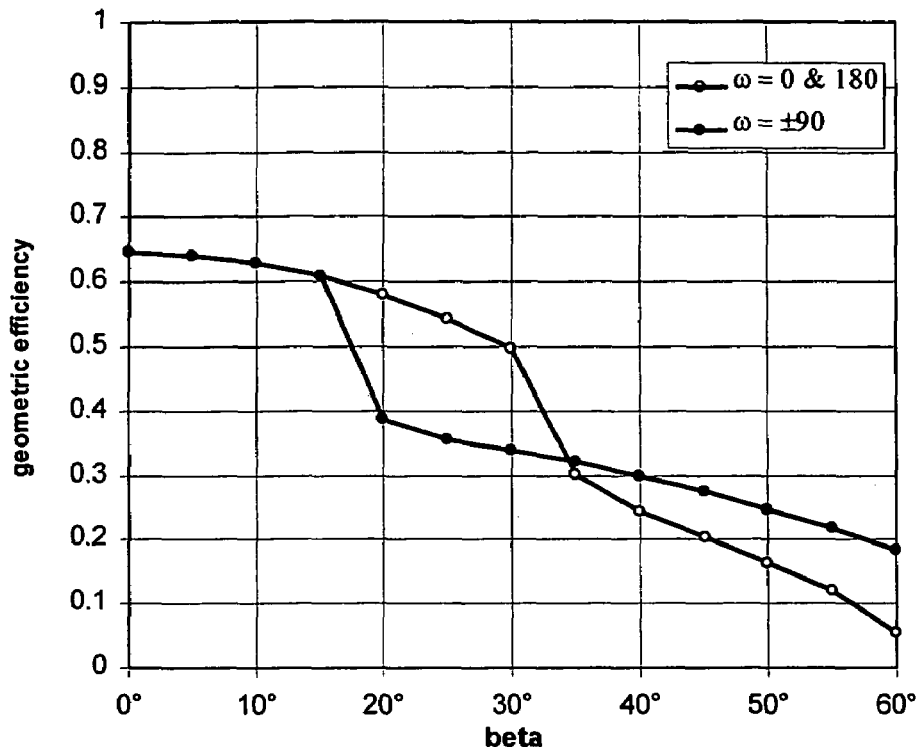
FIGS. 41A and 41B are graphs illustrating the geometric efficiency of the preferred embodiment with respectively, groove g3 vertical in the article and groove g3 rotated 10°.

FIG. 40 shows the geometric efficiency of this preferred embodiment over the full range of orientation angle ω, for entrance angle β between 0° and 60°. FIG. 41A graphs data from horizontal and vertical slices of FIG. 40. From FIG. 41A, at β=50°, the embodiment has geometric efficiency 24.8% in the ±90° omega directions and 16.5% in the 0° and 180° omega directions.

Applicant knows of no other rulable cube corner array consisting of triangles or quasi-triangles in n=1.586 material that combines the three described features of this preferred embodiment:

1. All cubes having TIR at β=15° for all ω.
2. Over 64% geometric efficiency at β=0°
3. Over 16% geometric efficiency at β=50° for ω=−90°, 0°, 90°, 180°.

Figure 41B:
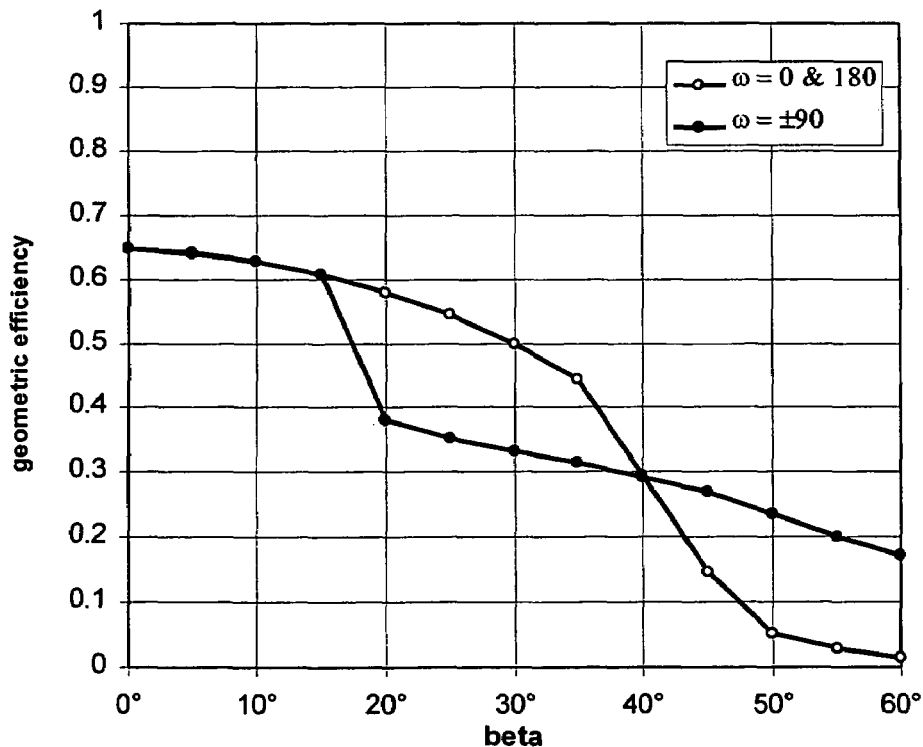
Figure 42A:
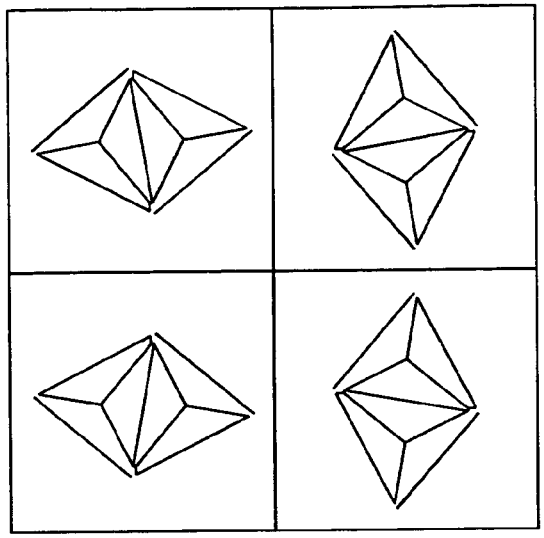
FIGS. 42A and 42B show schematically four pin assemblies of the preferred embodiment, the first with groove $g_3$ 10° off the vertical or the horizontal, the second with groove $g_3$ vertical or horizontal.
Figure 42B:
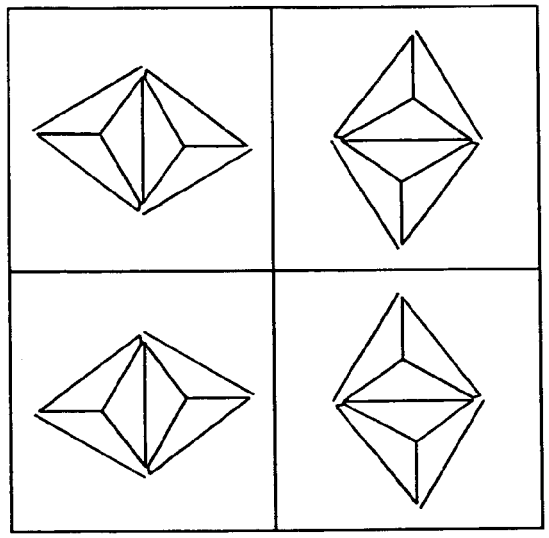
Figure 43A:
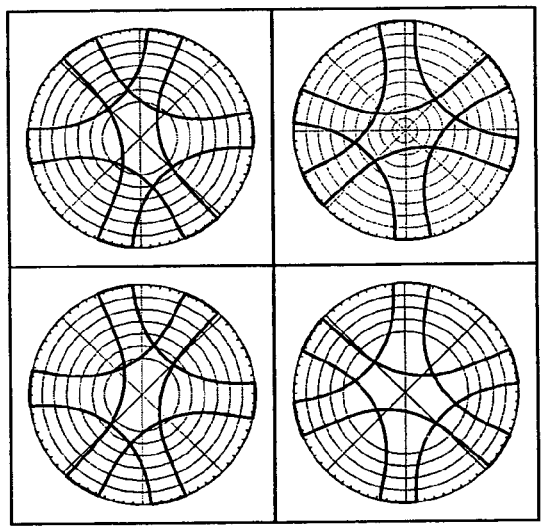
FIGS. 43A and 43B illustrate Chandler diagrams corresponding to the pins of FIGS. 42A and 42B.
Figure 43B:
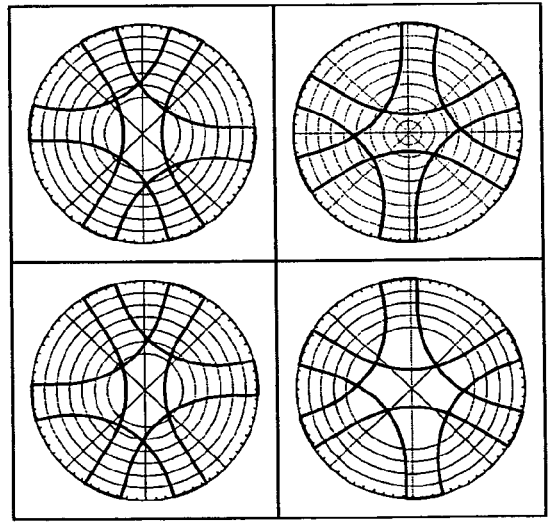
Figure 44:
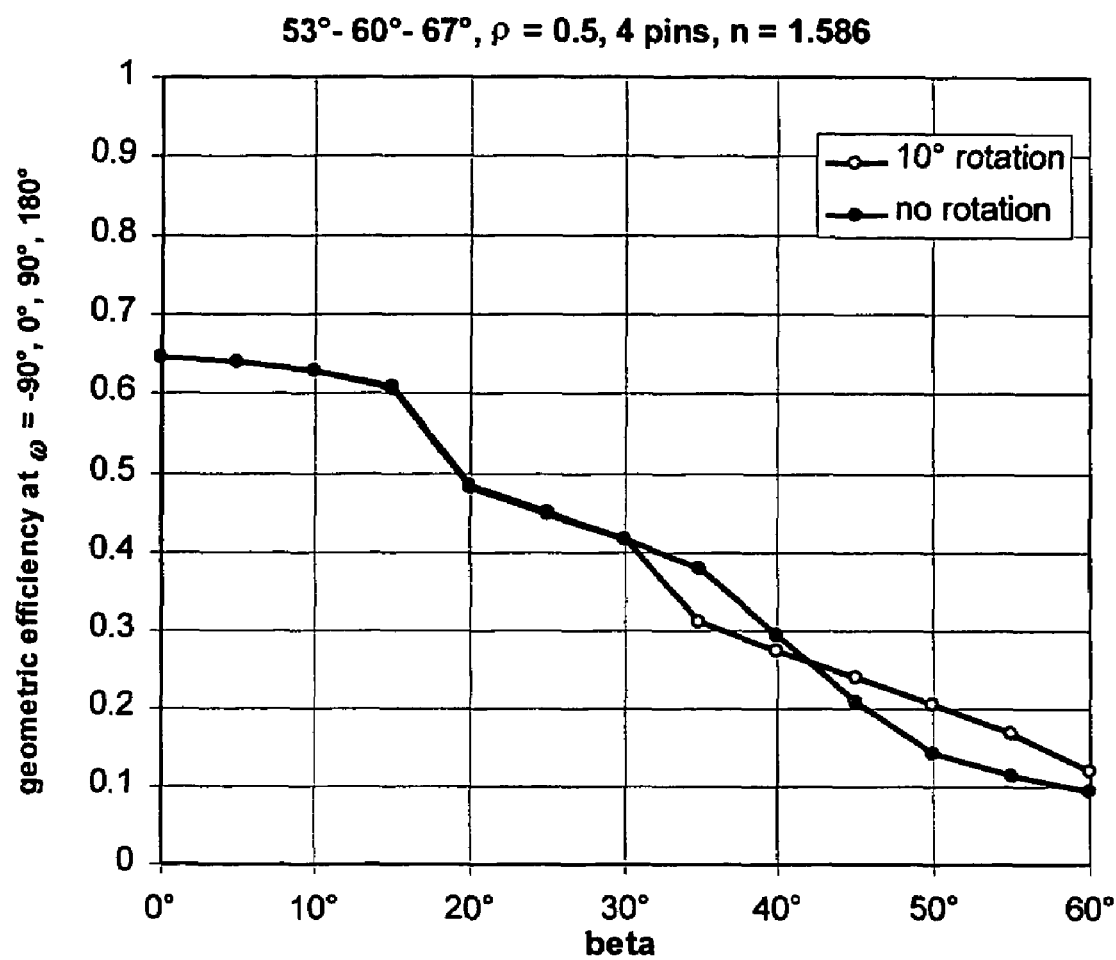
FIG. 44 is a graph illustrating the geometric efficiency of the pin assemblies schematized in FIGS. 42A and 42B.

It will be understood that this preferred embodiment includes design compromises. For example, without the 10° rotation, FIG. 41B would take the place of FIG. 41A. Comparison of FIGS. 41A and 41B shows that the 10° rotation substantially improved the geometric efficiency for β=50° in the 0° and 180° omega directions, but it substantially reduced the geometric efficiency for β=35° in the 0° and 180° omega directions. Users of this invention will appreciate that retroreflector design often involves difficult compromises, often involving β and ω tradeoffs. As described above, use of four pins can symmetrize the performance. FIG. 42A shows the representative cube corners, with 10° rotation, in each of the four pins. FIG. 42B shows the representative cube corners, with no rotation, in each of the four pins. For four-pinned assemblies, the two curves of FIG. 41A become a single averaged curve, and also the two curves of FIG. 41B become a single averaged curve. FIG. 44 shows the two resulting curves of geometric efficiency. After the pinning, the two designs are more nearly equivalent, but some β=35° versus β=50° tradeoffs remain. Note that the geometric efficiency curves of FIG. 44 do not take into account the estimated 0.95× derating for pinning losses. Note also that the data for these comparisons was collected at intervals of 5° in β and of 10° in ω. FIGS. 43A and 43B show the Chandler diagrams corresponding to each of the pins shown in FIGS. 42A and 42B.

The cube corners of this invention are expected to be micro-cube corners which in the present state of the art are best formed by ruling. The roots of the three grooves defining each quasi-triangular cube corner of this invention generally have no intersections, but lines along the groove roots determine a triangle when viewed in plan in a direction perpendicular to the ruling plane. The area of this triangle is less than about 0.3 mm² for micro-cube corners. Typically, the area of the triangle is in the range from about 0.007 mm² to about 0.07 mm².

Two optical factors remain for describing an embodiment: the size of the optical elements and the elements' aberrations. Size must be specified because cube corner prisms in sheetings are small enough that their diffraction characteristics significantly affect retroreflectance. Geometric efficiency depends the effective aperture area relative to the whole structure area. Diffraction efficiency depends on the absolute area and the shape of the effective aperture. Element size and aberration should be chosen according to the intended application of the sheeting. The cube corners of the present invention are intended for road sign and similar sheeting applications. Road sign sheeting primarily for long distance retroreflection will have relatively large prisms, with triangle areas greater than 0.03 mm², and small aberrations in order to produce a tight retroreflected light beam, perhaps specified to just 0.5° of divergence. Road sign sheeting intended for short distance retroreflection should have intentional aberrations for spreading the retroreflected light into a wider beam, perhaps specified to 2.0° divergence. It is then convenient and economical to make the prisms rather small, with triangle areas less than 0.015 mm², and let diffraction do some of the spreading. This precludes an intentional reduction at the center of the beam, but there is little to be gained from that strategy. The expected levels of retroreflected beam intensity across a 2.0° divergent beam are ¼ the levels across a 0.5° divergent beam of similar form. Thus designing a short distance road sign sheeting is much more challenging than designing a long distance road sign sheeting. While the high geometric efficiency of the cube corners of the present invention make them suitable for short distance road sign sheeting, this preferred embodiment is a medium distance road sign sheeting, intended for the majority of road signs This preferred embodiment is a ruling of quasi-triangular 53°-60°-67° cube corners, with axis displacement $\rho$=0.5, and triangle area 0.015 mm². The triangle area being 0.015 mm² implies that all the unitless linear dimensions in TABLE 2 must be multiplied by $\sqrt{0.015 mm^2}$=0.1225 mm to give the ruling dimensions in TABLE 3.

TABLE 3

|  | groove vee | groove spacing | groove depth |
|---|---|---|---|
| $g_1$ | 59.35° | 0.173 mm | 0.088 mm |
| $g_2$ | 68.88° | 0.160 mm | 0.076 mm |
| $g_3$ | 82.54° | 0.150 mm | 0.066 mm |

Users of the invention will do more accurate calculation for groove vee and groove spacing than given in TABLE 3. However, groove depth is not critical. Error of 0.001 mm in groove depth leads to small error in $\rho$ or small deviation of the apex from the HG line, which can be tolerated.

Methods for introducing cube corner aberrations during ruling are well-known in the art from Appeldorn U.S. Pat. No. 4,775,219. Pending U.S. patent application Ser. No. 10/167,135, filed Jun. 11, 2002, claiming the benefit of Ser. No. 60/297,394, filed Jun. 11, 2001, discloses other methods. Yet another method for introducing cube corner aberrations during the tool making process, disclosed in a pending U.S. patent application filed Dec. 12, 2002 entitled "Retroreflector with Controlled Divergence Made by the Method of Localized Substrate Stress", is employed in the present preferred embodiment. The sheeting is assumed to be embossed in clear colorless polycarbonate by the methods disclosed in Pricone et al. U.S. Pat. No. 4,486,363, using tools made by methods disclosed in Pricone U.S. Pat. No. 4,478,769 and containing the cube corners described by TABLE 3 as modified with aberrations similar in scale and distribution to those disclosed in the Dec. 12, 2002 application. Specifically, the average dihedral angle is 1.0 arc minutes and the standard deviation is 7.3 arc minutes.

At the time of this application there are only calculated coefficients of retroreflection, $R_A$, for a sheeting. The calculations include the effects of polarization and diffraction in accordance with the methods of Edson R. Peck ("Polarization Properties of Corner Reflectors and Cavities", Journal of the Optical Society of America, Volume 52, Number 3, March, 1962). Retroreflection involving multiple cubes is ignored. An $R_A$ reduction of 30% is allowed for the non-retroreflecting area of welds in non-metallized sheeting and an additional 10% is allowed for defects in tooling, materials and manufacturing.

Figure 45A:
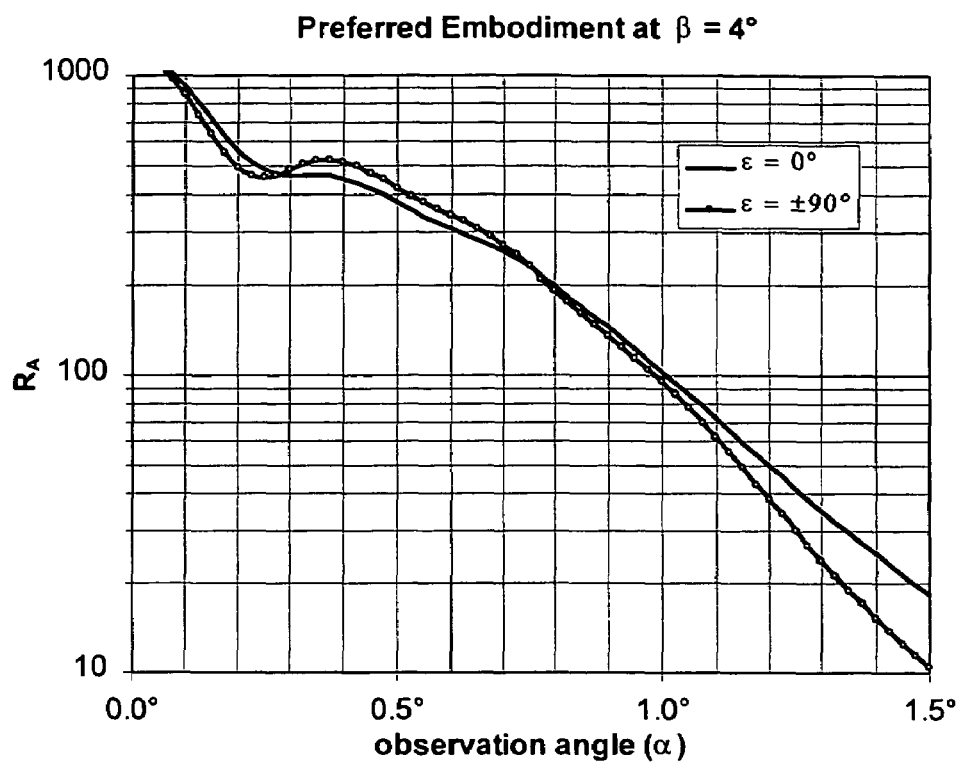
FIGS. 45A and 45B are graphs illustrating calculated values of the coefficient of retroreflection of the preferred embodiment.
Figure 45B:
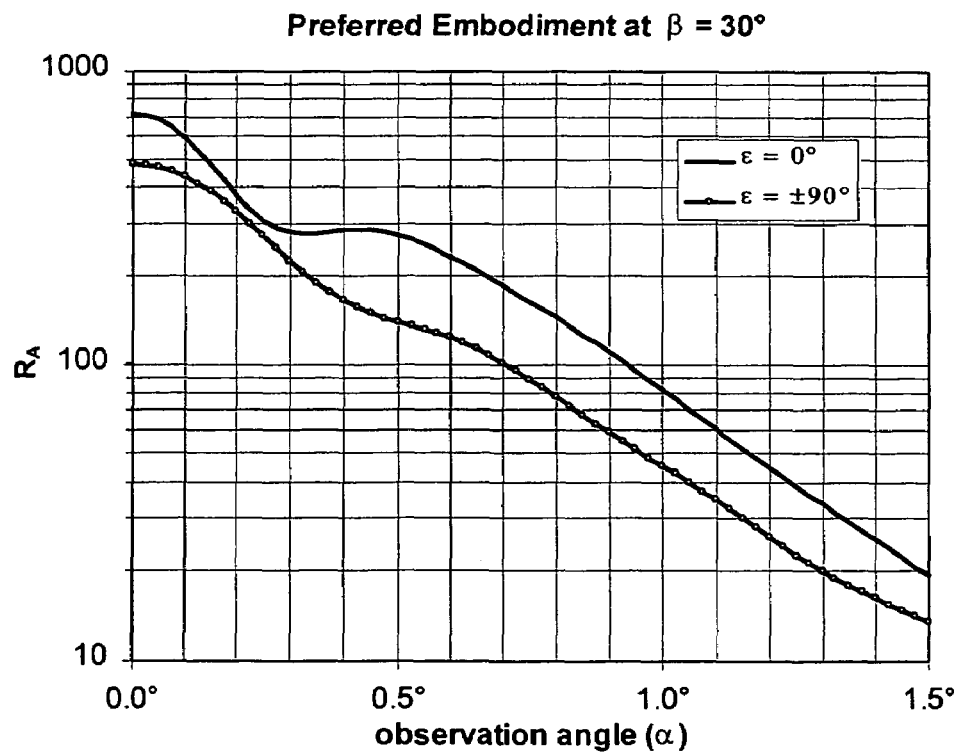

FIGS. 45A and 45B show the calculated coefficient of retroreflection of this preferred embodiment as it would be measured according to ASTM E 810-02 *Standard Test Method for Coefficient of Retroreflection of Retroreflective Sheeting Utilizing the Coplanar Geometry*. FIG. 45A is for entrance angle $\beta$=4° and FIG. 45B is for entrance angle $\beta$=30°.

$R_A$ measures the luminous intensity of the retroreflected light relative to the perpendicular illuminance provided by the illumination beam, for one square meter of sheeting. The ASTM test method measures this intensity at various divergence angles $\alpha$ in the plane that contains the illumination direction and the sheeting surface normal. Angle $\epsilon$ in the ASTM E 810-02 test method is equal to orientation angle $\omega$. All retroreflection angles are explained in ASTM E 808-01 *Standard Practice for Describing Retroreflection*. Angle $\omega$ of this application is denoted "$\omega_s$" in the ASTM document.

Table 4, derived from FIGS. 45A and 45B, gives calculated $R_A$ values of this preferred embodiment sheeting at the 16 angular test points required in ASTM D 4956-02 *Standard Specification for Retroreflective Sheeting for Traffic Control*.

TABLE 4

|  | $\alpha$ | $\beta_1$ | $\beta_2$ | $\epsilon$ | $R_A$ |
|---|---|---|---|---|---|
| 1 | 0.1° | −4° | 0° | 0° | 917 |
| 2 | 0.1° | −4° | 0° | 90° | 859 |
| 3 | 0.1° | 30° | 0° | 0° | 594 |
| 4 | 0.1° | 30° | 0° | 90° | 437 |
| 5 | 0.2° | −4° | 0° | 0° | 561 |
| 6 | 0.2° | −4° | 0° | 90° | 493 |
| 7 | 0.2° | 30° | 0° | 0° | 376 |
| 8 | 0.2° | 30° | 0° | 90° | 329 |
| 9 | 0.5° | −4° | 0° | 0° | 377 |
| 10 | 0.5° | −4° | 0° | 90° | 422 |
| 11 | 0.5° | 30° | 0° | 0° | 276 |
| 12 | 0.5° | 30° | 0° | 90° | 139 |
| 13 | 1.0° | −4° | 0° | 0° | 103 |
| 14 | 1.0° | −4° | 0° | 90° | 95 |
| 15 | 1.0° | 30° | 0° | 0° | 82 |
| 16 | 1.0° | 30° | 0° | 90° | 45 |

Those skilled in the art will appreciate that the above preferred embodiment is only illustrative of the invention, and that many modifications and variations are possible without departing from the scope and spirit of the invention. It is expected that road signs made from sheetings made according to the invention will efficiently retroreflect vehicle head lights at night and be bright from sun and skylight by day.

What is claimed is:

1. A tool comprising a rulable array of cube corners wherein, for each cube corner, the longest edges of each of its faces are mutually skew.

2. The tool defined in claim 1, wherein said cube corners have compound cant.

3. The tool defined in claim 1, wherein the axis of each of said cube corners is skew to the axes of its three opposing neighbors.

4. The tool defined in claim 1, wherein said cube corners are geometrically congruent.

* * * * *

UNITED STATES PATENT AND TRADEMARK OFFICE
CERTIFICATE OF CORRECTION

PATENT NO. : 7,334,904 B2
APPLICATION NO. : 10/935276
DATED : February 26, 2008
INVENTOR(S) : Dennis I. Couzin It is certified that error appears in the above-identified patent and that said Letters Patent is hereby corrected as shown below:

Column 8, line 10, "the normal is between the cube axis" should be changed to --the cube axis is between the normal--; line 17, "the dihedral edge is between the cube axis and the normal" should be changed to --the normal is between the cube axis and the dihedral edge--; and lines 21-23, "such that the cube axis, one of the dihedral edges, and a normal from the cube corner apex to the sheeting surface do not lie in one plane" should be changed to --such that none of the dihedral edges lies in the same plane as the cube axis and a normal from the cube corner apex to the sheeting surface--.

Signed and Sealed this

Fifteenth Day of June, 2010

David J. Kappos
*Director of the United States Patent and Trademark Office*